US012744639B2

(12) United States Patent
Li et al.

(10) Patent No.: US 12,744,639 B2
(45) Date of Patent: Sep. 22, 2026

(54) DEMODULATION REFERENCE SIGNALING FOR SELECTIVE CHANNELS

(71) Applicant: QUALCOMM Incorporated, San Diego, CA (US)

(72) Inventors: Qiaoyu Li, Beijing (CN); Yu Zhang, San Diego, CA (US); Liangming Wu, Beijing (CN); Chenxi Hao, Beijing (CN); Hao Xu, Beijing (CN); Min Huang, Beijing (CN); Chao Wei, Beijing (CN); Wei Xi, Beijing (CN)

(73) Assignee: QUALCOMM Incorproated, San Diego, CA (US)

( * ) Notice: Subject to any disclaimer, the term of this patent is extended or adjusted under 35 U.S.C. 154(b) by 796 days.

(21) Appl. No.: 17/998,251

(22) PCT Filed: Jun. 17, 2020

(86) PCT No.: PCT/CN2020/096481
§ 371 (c)(1),
(2) Date: Nov. 8, 2022

(87) PCT Pub. No.: WO2021/253260
PCT Pub. Date: Dec. 23, 2021

(65) Prior Publication Data
US 2023/0216636 A1 Jul. 6, 2023

(51) Int. Cl.
*H04L 5/00* (2006.01)
*H04L 25/02* (2006.01)

(52) U.S. Cl.
CPC ........ *H04L 5/0051* (2013.01); *H04L 25/0224* (2013.01)

(58) Field of Classification Search
None
See application file for complete search history.

(56) References Cited

U.S. PATENT DOCUMENTS

2014/0254516 A1* 9/2014 Lee .................... H04W 74/002 370/329
2014/0321414 A1* 10/2014 Chun .................... H04L 5/0051 370/329

(Continued)

FOREIGN PATENT DOCUMENTS

CN 110121912 A 8/2019

OTHER PUBLICATIONS

International Search Report and Written Opinion—PCT/CN2020/096481—ISA/EPO—Mar. 16, 2021 (204898WO1).

(Continued)

*Primary Examiner* — Phirin Sam
(74) *Attorney, Agent, or Firm* — Holland & Hart LLP

(57) ABSTRACT

Methods, systems, and devices for wireless communications are described. A communication device, which may be a user equipment (UE), may receive a message including an indication of a set of demodulation reference signal (DMRS) candidates for a data channel. The data channel may be a physical downlink shared channel (PDSCH) or a physical uplink shared channel (PUSCH) in some examples. The UE may determine a set of parameters associated with the set of DMRS candidates based on the received message. The set of parameters may correspond to a radio frequency spectrum subband or a radio frequency spectrum band associated with the data channel. The UE may estimate one or more characteristics of the data channel using the set of parameters associated with the set of DMRS candidates to perform wireless communication (e.g., PDSCH reception, PUSCH transmission).

35 Claims, 17 Drawing Sheets

(56) References Cited

U.S. PATENT DOCUMENTS

2016/0006546 A1* 1/2016 Yi .................... H04W 72/0453 370/329
2016/0036573 A1* 2/2016 Tanaka .................. H04W 24/02 370/329
2016/0112994 A1* 4/2016 Wang .................. H04L 25/0226 370/329
2016/0227525 A1* 8/2016 Werner ................. H04L 1/0072
2018/0176059 A1* 6/2018 Medles ................. H04W 72/54
2018/0254867 A1* 9/2018 Kim ..................... H04B 7/0452
2019/0159181 A1 5/2019 Manolakos et al.
2019/0349148 A1 11/2019 Nammi
2020/0100154 A1* 3/2020 Cirik .................. H04B 7/06964
2020/0228273 A1* 7/2020 Yoon ..................... H04L 5/0051
2020/0245309 A1* 7/2020 Xia ....................... H04W 72/23
2020/0267774 A1* 8/2020 Vos ....................... H04L 5/0048
2020/0296758 A1* 9/2020 Li ........................... H04L 5/001
2020/0337068 A1* 10/2020 Yi ......................... H04W 72/04
2020/0351896 A1* 11/2020 Taherzadeh Boroujeni ................ H04L 1/0045
2021/0076371 A1* 3/2021 Bhamri ............... H04W 64/006
2021/0167909 A1* 6/2021 Nam ................... H04L 27/2613
2021/0344462 A1* 11/2021 Jiao ....................... H04L 5/0051
2022/0174710 A1* 6/2022 Liu ....................... H04L 5/0044
2023/0053070 A1* 2/2023 Li ....................... H04W 72/232
2023/0224116 A1* 7/2023 Kwak ................... H04W 72/23 370/329
2024/0073914 A1* 2/2024 Haghighat ............ H04W 72/23

OTHER PUBLICATIONS

QUALCOMM: “Summary of Issues for PDSCH/PUSCH’s DM-RS”, 3GPP Draft; 3GPP TSG RAN WG1 Meeting #92, R1-1803323, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 26, 2018-Mar. 2, 2018, Feb. 27, 2018 (Feb. 27, 2018), XP051398475, 16 Pages, Section 9, the Whole Document.

* cited by examiner

200

400

600

1000

1100

DEMODULATION REFERENCE SIGNALING FOR SELECTIVE CHANNELS

CROSS REFERENCE

The present Application is a 371 national stage filing of International PCT Application No. PCT/CN2020/096481 by LI et al. entitled "DEMODULATION REFERENCE SIGNALING FOR SELECTIVE CHANNELS," filed Jun. 17, 2020, which is assigned to the assignee hereof, and which is expressly incorporated by reference in its entirety herein.

FIELD OF TECHNOLOGY

The following relates generally to wireless communications and to demodulation reference signaling for selective channels.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

Various aspects of the described techniques relate to configuring a communication device, which may be otherwise known as user equipment (UE) to support demodulation reference signaling for selective channels. A wireless communications system may support communications between a UE and a base station over a radio frequency spectrum band (e.g., a wideband) or one or multiple radio frequency spectrum subbands. The wireless communications system may configure (e.g., via a base station) the UE with multiple candidates, such as demodulation reference signal (DMRS) candidates, including a set of parameters specific to the radio frequency spectrum band or the one or multiple radio frequency spectrum subbands to use when performing channel estimation. For example, as part of the channel estimation, the UE may be configured to estimate characteristics of a data channel (e.g., a physical uplink shared channel (PUSCH)) based on the one or multiple DMRS candidates using the set of parameters specific to the radio frequency spectrum band or the one or multiple radio frequency spectrum subbands. The described techniques may, as a result, include features for improvements to channel estimation operations for selective channels and, in some examples, may promote high reliability and low latency wireless communications in various system, such as 4G and 5G systems, among other benefits.

A method of wireless communication at a UE is described. The method may include receiving a message including an indication of a set of DMRS candidates for a data channel, determining a set of parameters associated with the set of DMRS candidates based on the received message, the set of parameters corresponding to a radio frequency spectrum subband or a radio frequency spectrum band associated with the data channel, and estimating one or more characteristics of the data channel using the set of parameters associated with the set of DMRS candidates.

An apparatus for wireless communication is described. The apparatus may include a processor, memory coupled with the processor, and instructions stored in the memory. The instructions may be executable by the processor to cause the apparatus to receive a message including an indication of a set of DMRS candidates for a data channel, determine a set of parameters associated with the set of DMRS candidates based on the received message, the set of parameters corresponding to a radio frequency spectrum subband or a radio frequency spectrum band associated with the data channel, and estimate one or more characteristics of the data channel using the set of parameters associated with the set of DMRS candidates.

Another apparatus for wireless communication is described. The apparatus may include means for receiving a message including an indication of a set of DMRS candidates for a data channel, determining a set of parameters associated with the set of DMRS candidates based on the received message, the set of parameters corresponding to a radio frequency spectrum subband or a radio frequency spectrum band associated with the data channel, and estimating one or more characteristics of the data channel using the set of parameters associated with the set of DMRS candidates.

A non-transitory computer-readable medium storing code for wireless communication at a UE is described. The code may include instructions executable by a processor to receive a message including an indication of a set of DMRS candidates for a data channel, determine a set of parameters associated with the set of DMRS candidates based on the received message, the set of parameters corresponding to a radio frequency spectrum subband or a radio frequency spectrum band associated with the data channel, and estimate one or more characteristics of the data channel using the set of parameters associated with the set of DMRS candidates.

Some examples of the method, apparatuses, and non-transitory computer-readable medium described herein may further include operations, features, means, or instructions for determining a number of symbols associated with the set of DMRS candidates for the data channel based on the set of parameters associated with the set of DMRS candidates, where estimating the one or more characteristics of the data channel includes, and estimating the one or more characteristics of the data channel based on the number of symbols associated with the set of DMRS candidates for the data channel.

Some examples of the method, apparatuses, and non-transitory computer-readable medium described herein may further include operations, features, means, or instructions for determining a location of at least one symbol of the number of symbols associated with the set of DMRS candidates for the data channel in a slot based on the set of parameters associated with the set of DMRS candidates, where estimating the one or more characteristics of the data channel includes, and estimating the one or more characteristics of the data channel based on the location of the at least one symbol of the number of symbols associated with the set of DMRS candidates for the data channel in the slot.

Some examples of the method, apparatuses, and non-transitory computer-readable medium described herein may further include operations, features, means, or instructions for determining a number of resource elements associated with at least one symbol of the number of symbols associated with the set of DMRS candidates for the data channel based on the set of parameters associated with the set of DMRS candidates, where estimating the one or more characteristics of the data channel includes, and estimating the one or more characteristics of the data channel based on the number of resource elements associated with the at least one symbol of the number of symbols associated with the set of DMRS candidates for the data channel.

Some examples of the method, apparatuses, and non-transitory computer-readable medium described herein may further include operations, features, means, or instructions for determining, based on the set of parameters associated with the set of DMRS candidates, that the number of resource elements associated with at least one symbol of the number of symbols associated with the set of DMRS candidates may be reserved for the data channel.

Some examples of the method, apparatuses, and non-transitory computer-readable medium described herein may further include operations, features, means, or instructions for determining an energy per resource element (EPRE) ratio based on the set of parameters associated with the set of DMRS candidates, where estimating the one or more characteristics of the data channel includes, and estimating the one or more characteristics of the data channel based on the EPRE ratio associated with the set of DMRS candidates.

In some examples of the method, apparatuses, and non-transitory computer-readable medium described herein, determining the EPRE ratio may include operations, features, means, or instructions for determining the EPRE ratio between a first resource element associated with a DMRS candidate and a second resource element associated with the data channel, where estimating the one or more characteristics of the data channel includes, and estimating the one or more characteristics of the data channel based on the EPRE ratio between the first resource element associated with the DMRS candidate and the second resource element associated with the data channel.

In some examples of the method, apparatuses, and non-transitory computer-readable medium described herein, receiving the message may include operations, features, means, or instructions for receiving a radio resource control (RRC) configuration message including the indication of the set of DMRS candidates for the data channel.

Some examples of the method, apparatuses, and non-transitory computer-readable medium described herein may further include operations, features, means, or instructions for determining a size of the radio frequency spectrum subband based on at least one parameter of the set of parameters, where estimating the one or more characteristics of the data channel includes, and estimating the one or more characteristics of the data channel based on the size of the radio frequency spectrum subband.

In some examples of the method, apparatuses, and non-transitory computer-readable medium described herein, the size of the radio frequency spectrum subband may be UE-specific.

Some examples of the method, apparatuses, and non-transitory computer-readable medium described herein may further include operations, features, means, or instructions for determining a default size associated with the radio frequency spectrum subband based on at least one parameter of the set of parameters, where determining a size of the radio frequency spectrum subband includes, assigning the default size to the radio frequency spectrum subband, where estimating the one or more characteristics of the data channel includes, and estimating the one or more characteristics of the data channel based on the default size of the radio frequency spectrum subband.

Some examples of the method, apparatuses, and non-transitory computer-readable medium described herein may further include operations, features, means, or instructions for determining a size of a physical resource block (PRB) group associated with the set of DMRS candidates, where determining a size of the radio frequency spectrum subband includes, and determining the size of the radio frequency spectrum subband based on the size of the PRB group.

Some examples of the method, apparatuses, and non-transitory computer-readable medium described herein may further include operations, features, means, or instructions for determining a size of a PRB bundle associated with the set of DMRS candidates, where determining a size of the radio frequency spectrum subband includes, and determining the size of the radio frequency spectrum subband based on the size of the PRB bundle.

Some examples of the method, apparatuses, and non-transitory computer-readable medium described herein may further include operations, features, means, or instructions for receiving a channel state information (CSI) report including an indication of a size of the radio frequency spectrum subband, identifying the size of the radio frequency spectrum subband based on the received CSI information report, where estimating the one or more characteristics of the data channel includes, and estimating the one or more characteristics of the data channel based on the size of the radio frequency spectrum subband.

Some examples of the method, apparatuses, and non-transitory computer-readable medium described herein may further include operations, features, means, or instructions for determining at least two adjacent symbols associated with the set of DMRS candidates for the data channel include a same quasi co-location (QCL) type based on the set of parameters associated with the set of DMRS candidates, where estimating the one or more characteristics of the data channel includes, and estimating the one or more characteristics of the data channel based on the at least two adjacent symbols associated with the set of DMRS candidates for the data channel including a same QCL type.

Some examples of the method, apparatuses, and non-transitory computer-readable medium described herein may further include operations, features, means, or instructions for determining at least two adjacent symbols associated with the set of DMRS candidates for the data channel include different QCL types based on the set of parameters associated with the set of DMRS candidates, where estimating the one or more characteristics of the data channel includes, and estimating the one or more characteristics of the data channel based on the at least two adjacent symbols associated with the set of DMRS candidates for the data channel including different QCL types.

In some examples of the method, apparatuses, and non-transitory computer-readable medium described herein, receiving the message may include operations, features, means, or instructions for receiving a downlink control information (DCI) message, identifying at least one DMRS candidate of the set of DMRS candidates for the data channel based on the DCI message, where estimating the one or more characteristics of the data channel includes, and estimating the one or more characteristics of the data channel using the at least one DMRS candidate.

In some examples of the method, apparatuses, and non-transitory computer-readable medium described herein, the DCI message includes a group common downlink control information (GC-DCI) message associated with a group of UEs.

In some examples of the method, apparatuses, and non-transitory computer-readable medium described herein, the GC-DCI message includes a second indication of the at least one DMRS candidate of the set of DMRS candidates for the data channel.

Some examples of the method, apparatuses, and non-transitory computer-readable medium described herein may further include operations, features, means, or instructions for determining a default DMRS candidate of the set of DMRS candidates for the data channel based on the received message, where estimating the one or more characteristics of the data channel includes, and estimating the one or more characteristics of the data channel using the default DMRS candidate.

Some examples of the method, apparatuses, and non-transitory computer-readable medium described herein may further include operations, features, means, or instructions for determining an order of each DMRS candidate in the set of DMRS candidates for the data channel based on the received message, where estimating the one or more characteristics of the data channel includes, and estimating the one or more characteristics of the data channel based on the order of each DMRS candidate in the set of DMRS candidates.

Some examples of the method, apparatuses, and non-transitory computer-readable medium described herein may further include operations, features, means, or instructions for determining a density of the set of DMRS candidates or an EPRE ratio of each DMRS candidate of the set of DMRS candidates, ordering each DMRS candidate in the set of DMRS candidates based on the density of the set of DMRS candidates or the EPRE ratio of each DMRS candidate of the set of DMRS candidates, where estimating the one or more characteristics of the data channel includes, and estimating the one or more characteristics of the data channel based on the ordering.

Some examples of the method, apparatuses, and non-transitory computer-readable medium described herein may further include operations, features, means, or instructions for receiving a DCI message including a second indication of a differential step identifying a differential DMRS candidate index-step, selecting a DMRS candidate from the set of DMRS candidates by comparing the differential DMRS candidate index-step to an index of a default DMRS candidate, where estimating the one or more characteristics of the data channel includes, and estimating the one or more characteristics of the data channel using the selected DMRS candidate.

In some examples of the method, apparatuses, and non-transitory computer-readable medium described herein, the DCI message includes a GC-DCI message associated with a group of UEs.

Some examples of the method, apparatuses, and non-transitory computer-readable medium described herein may further include operations, features, means, or instructions for identifying a DMRS candidate having a highest DMRS density in the set of DMRS candidates, determining a default transport block size associated with the data channel based on the identified DMRS candidate having the highest DMRS density, where estimating the one or more characteristics of the data channel includes, and estimating the one or more characteristics of the data channel based on the default transport block size associated with the data channel.

Some examples of the method, apparatuses, and non-transitory computer-readable medium described herein may further include operations, features, means, or instructions for identifying a DMRS candidate having a lowest DMRS density in the set of DMRS candidates, determining a default transport block size associated with the data channel based on the identified DMRS candidate having the lowest DMRS density, where estimating the one or more characteristics of the data channel includes, and estimating the one or more characteristics of the data channel based on the default transport block size associated with the data channel.

In some examples of the method, apparatuses, and non-transitory computer-readable medium described herein, estimating the one or more characteristics of the data channel further may include operations, features, means, or instructions for estimating the one or more characteristics of the data channel based on blind selecting a DMRS candidate of the set of DMRS candidates.

Some examples of the method, apparatuses, and non-transitory computer-readable medium described herein may further include operations, features, means, or instructions for receiving a second message including a second indication to activate one or more DMRS candidates of the set of DMRS candidates for the data channel, receiving a third message including a third indication of at least one DMRS candidate of the activated one or more DMRSs, where estimating the one or more characteristics of the data channel includes, and estimating the one or more characteristics of the data channel using the at least one DMRS candidate.

In some examples of the method, apparatuses, and non-transitory computer-readable medium described herein, the third message includes a UE-specific DCI message or a GC-DCI message, and the second message includes a medium access control-control element (MAC-CE) message.

Some examples of the method, apparatuses, and non-transitory computer-readable medium described herein may further include operations, features, means, or instructions for receiving a second message including a second indication to deactivate the one or more DMRS candidates of the set of DMRS candidates, receiving a third message including a third indication of at least one DMRS candidate of the set of DMRS candidates remaining activated, where estimating the one or more characteristics of the data channel includes, and estimating the one or more characteristics of the data channel using the at least one DMRS candidate.

In some examples of the method, apparatuses, and non-transitory computer-readable medium described herein, the third message includes a UE-specific DCI message or a GC-DCI message, and the second message includes a MAC-CE message.

Some examples of the method, apparatuses, and non-transitory computer-readable medium described herein may further include operations, features, means, or instructions for identifying a quasi-colocation (QCL) state or a transmission configuration indication (TCI) state based on the received message, determining a DMRS candidate of the set of DMRS candidates based on the QCL state or the TCI state, where estimating the one or more characteristics of the data channel includes, and estimating the one or more characteristics of the data channel using the determined DMRS candidate.

In some examples of the method, apparatuses, and non-transitory computer-readable medium described herein, the data channel includes a physical downlink shared channel (PDSCH). In some examples of the method, apparatuses, and non-transitory computer-readable medium described herein, the data channel includes a PUSCH.

A method of wireless communications at a base station is described. The method may include determining a set of parameters associated with a set of DMRS candidates, the set of parameters corresponding to a radio frequency spectrum subband or a radio frequency spectrum band associated with a data channel, transmitting a message including an indication of the set of DMRS candidates and the associated set of parameters for the data channel, and estimating one or more characteristics of the data channel using the set of parameters associated with the set of DMRS candidates.

An apparatus for wireless communications is described. The apparatus may include a processor, memory coupled with the processor, and instructions stored in the memory. The instructions may be executable by the processor to cause the apparatus to determine a set of parameters associated with a set of DMRS candidates, the set of parameters corresponding to a radio frequency spectrum subband or a radio frequency spectrum band associated with a data channel, transmit a message including an indication of the set of DMRS candidates and the associated set of parameters for the data channel, and estimate one or more characteristics of the data channel using the set of parameters associated with the set of DMRS candidates.

Another apparatus for wireless communications is described. The apparatus may include means for determining a set of parameters associated with a set of DMRS candidates, the set of parameters corresponding to a radio frequency spectrum subband or a radio frequency spectrum band associated with a data channel, transmitting a message including an indication of the set of DMRS candidates and the associated set of parameters for the data channel, and estimating one or more characteristics of the data channel using the set of parameters associated with the set of DMRS candidates.

A non-transitory computer-readable medium storing code for wireless communications at a base station is described. The code may include instructions executable by a processor to determine a set of parameters associated with a set of DMRS candidates, the set of parameters corresponding to a radio frequency spectrum subband or a radio frequency spectrum band associated with a data channel, transmit a message including an indication of the set of DMRS candidates and the associated set of parameters for the data channel, and estimate one or more characteristics of the data channel using the set of parameters associated with the set of DMRS candidates.

Some examples of the method, apparatuses, and non-transitory computer-readable medium described herein may further include operations, features, means, or instructions for allocating a number of symbols associated with the set of DMRS candidates for the data channel based on the set of parameters associated with the set of DMRS candidates, where estimating the one or more characteristics of the data channel includes, and estimating the one or more characteristics of the data channel based on the number of symbols associated with the set of DMRS candidates for the data channel.

Some examples of the method, apparatuses, and non-transitory computer-readable medium described herein may further include operations, features, means, or instructions for allocating a location of at least one symbol of the number of symbols associated with the set of DMRS candidates for the data channel in a slot based on the set of parameters associated with the set of DMRS candidates, where estimating the one or more characteristics of the data channel includes, and estimating the one or more characteristics of the data channel based on the location of the at least one symbol of the number of symbols associated with the set of DMRS candidates for the data channel in the slot.

Some examples of the method, apparatuses, and non-transitory computer-readable medium described herein may further include operations, features, means, or instructions for allocating a number of resource elements associated with at least one symbol of the number of symbols associated with the set of DMRS candidates for the data channel based on the set of parameters associated with the set of DMRS candidates, where estimating the one or more characteristics of the data channel includes, and estimating the one or more characteristics of the data channel based on the number of resource elements associated with the at least one symbol of the number of symbols associated with the set of DMRS candidates for the data channel.

Some examples of the method, apparatuses, and non-transitory computer-readable medium described herein may further include operations, features, means, or instructions for reserving the number of resource elements associated with at least one symbol of the number of symbols associated with the set of DMRS candidates for the data channel based on the set of parameters associated with the set of DMRS candidates.

Some examples of the method, apparatuses, and non-transitory computer-readable medium described herein may further include operations, features, means, or instructions for allocating an EPRE ratio associated with at least one symbol associated with the set of DMRS candidates based on the set of parameters associated with the set of DMRS candidates, where estimating the one or more characteristics of the data channel includes, and estimating the one or more characteristics of the data channel based on the EPRE ratio associated with at least one symbol associated with the set of DMRS candidates.

In some examples of the method, apparatuses, and non-transitory computer-readable medium described herein, allocating the EPRE ratio may include operations, features, means, or instructions for allocating the EPRE ratio between a first resource element associated with the set of DMRS candidates and a second resource element associated with the data channel, where estimating the one or more characteristics of the data channel includes, and estimating the one or more characteristics of the data channel based on the EPRE ratio between the first resource element associated with the set of DMRS candidates and the second resource element associated with the data channel.

In some examples of the method, apparatuses, and non-transitory computer-readable medium described herein, transmitting the message may include operations, features, means, or instructions for transmitting an RRC configuration message including the indication of the set of DMRS candidates for the data channel.

Some examples of the method, apparatuses, and non-transitory computer-readable medium described herein may further include operations, features, means, or instructions for allocating a size of the radio frequency spectrum subband, where estimating the one or more characteristics of the data channel includes, and estimating the one or more characteristics of the data channel based on the size of the radio frequency spectrum subband.

In some examples of the method, apparatuses, and non-transitory computer-readable medium described herein, the size of the radio frequency subband may be UE-specific.

Some examples of the method, apparatuses, and non-transitory computer-readable medium described herein may further include operations, features, means, or instructions for allocating a default size associated with the radio frequency spectrum subband based on a subband related parameter, where allocating a size of the radio frequency spectrum subband includes, assigning the default size to the radio frequency spectrum subband, where estimating the one or more characteristics of the data channel includes, and estimating the one or more characteristics of the data channel based on the default size of the radio frequency spectrum subband.

In some examples of the method, apparatuses, and non-transitory computer-readable medium described herein, allocating a size of a PRB group associated with the set of DMRS candidates or the data channel, where allocating a size of the radio frequency spectrum subband may include operations, features, means, or instructions for allocating the size of the radio frequency spectrum subband based on the size of the PRB group.

In some examples of the method, apparatuses, and non-transitory computer-readable medium described herein, allocating a size of a PRB bundle associated with the set of DMRS candidates or the data channel, where allocating a size of the radio frequency spectrum subband may include operations, features, means, or instructions for allocating the size of the radio frequency spectrum subband based on the size of the PRB bundle.

Some examples of the method, apparatuses, and non-transitory computer-readable medium described herein may further include operations, features, means, or instructions for transmitting a CSI information report including an indication of a size of the radio frequency spectrum subband, where estimating the one or more characteristics of the data channel includes, and estimating the one or more characteristics of the data channel based on the size of the radio frequency spectrum subband.

Some examples of the method, apparatuses, and non-transitory computer-readable medium described herein may further include operations, features, means, or instructions for determining at least two adjacent symbols associated with the set of DMRS candidates for the data channel include a same QCL type based on the set of parameters associated with the set of DMRS candidates, where estimating the one or more characteristics of the data channel includes, and estimating the one or more characteristics of the data channel based on the at least two adjacent symbols associated with the set of DMRS candidates for the data channel including a same QCL type.

Some examples of the method, apparatuses, and non-transitory computer-readable medium described herein may further include operations, features, means, or instructions for determining at least two adjacent symbols associated with the set of DMRS candidates for the data channel include a same QCL type based on the set of parameters associated with the set of DMRS candidates, where estimating the one or more characteristics of the data channel includes, and estimating the one or more characteristics of the data channel based on the at least two adjacent symbols associated with the set of DMRS candidates for the data channel including different QCL types.

In some examples of the method, apparatuses, and non-transitory computer-readable medium described herein, transmitting the message may include operations, features, means, or instructions for estimating the one or more characteristics of the data channel using the at least one DMRS candidate.

In some examples of the method, apparatuses, and non-transitory computer-readable medium described herein, the DCI message includes a GC-DCI message associated with a group of UEs.

In some examples of the method, apparatuses, and non-transitory computer-readable medium described herein, the GC-DCI message includes a second indication of the at least one DMRS candidate of the set of DMRS candidates for the data channel.

Some examples of the method, apparatuses, and non-transitory computer-readable medium described herein may further include operations, features, means, or instructions for allocating a default DMRS candidate of the set of DMRS candidates for the data channel based on the set of parameters associated with the set of DMRS candidates, where estimating the one or more characteristics of the data channel includes, and estimating the one or more characteristics of the data channel using the default DMRS candidate.

Some examples of the method, apparatuses, and non-transitory computer-readable medium described herein may further include operations, features, means, or instructions for allocating an order of each DMRS candidate in the set of DMRS candidates for the data channel based on the set of parameters associated with the set of DMRS candidates, where estimating the one or more characteristics of the data channel includes, and estimating the one or more characteristics of the data channel based on the order of each DMRS candidate in the set of DMRS candidates.

Some examples of the method, apparatuses, and non-transitory computer-readable medium described herein may further include operations, features, means, or instructions for allocating a density of the set of DMRS candidates or an EPRE ratio of each DMRS candidate of the set of DMRS candidates, ordering each DMRS candidate in the set of DMRS candidates based on the density of the set of DMRS candidates or the EPRE ratio of each DMRS candidate of the set of DMRS candidates, where estimating the one or more characteristics of the data channel includes, and estimating the one or more characteristics of the data channel based on the ordering.

Some examples of the method, apparatuses, and non-transitory computer-readable medium described herein may further include operations, features, means, or instructions for transmitting a DCI message including a second indication of a differential step identifying a differential DMRS candidate index-step, selecting a DMRS candidate from the set of DMRS candidates by comparing the differential DMRS candidate index-step to an index of a default DMRS candidate, where estimating the one or more characteristics of the data channel includes, and estimating the one or more characteristics of the data channel using the selected DMRS candidate.

In some examples of the method, apparatuses, and non-transitory computer-readable medium described herein, the DCI message includes a GC-DCI message associated with a group of UEs.

Some examples of the method, apparatuses, and non-transitory computer-readable medium described herein may further include operations, features, means, or instructions for identifying a DMRS candidate having a highest DMRS density in the set of DMRS candidates, determining a default transport block size associated with the data channel based on identified DMRS candidate having the highest DMRS density, where estimating the one or more characteristics of the data channel includes, and estimating the one or more characteristics of the data channel based on the default transport block size associated with the data channel.

Some examples of the method, apparatuses, and non-transitory computer-readable medium described herein may further include operations, features, means, or instructions for identifying a DMRS candidate having a lowest DMRS density in the set of DMRS candidates, determining a default transport block size associated with the data channel based on identified DMRS candidate having the lowest DMRS density, where estimating the one or more characteristics of the data channel includes, and estimating the one or more characteristics of the data channel based on the default transport block size associated with the data channel.

In some examples of the method, apparatuses, and non-transitory computer-readable medium described herein, estimating the one or more characteristics of the data channel further may include operations, features, means, or instructions for estimating the one or more characteristics of the data channel based on blind selecting a DMRS candidate of the set of DMRS candidates.

Some examples of the method, apparatuses, and non-transitory computer-readable medium described herein may further include operations, features, means, or instructions for transmitting a second message including a second indication to activate one or more DMRS candidates of the set of DMRS candidates for the data channel, transmitting a third message including a third indication of at least one DMRS candidate of the activated one or more DMRSs, where estimating the one or more characteristics of the data channel includes, and estimating the one or more characteristics of the data channel using the at least one DMRS candidate.

In some examples of the method, apparatuses, and non-transitory computer-readable medium described herein, the third message includes a UE-specific DCI message or a GC-DCI message, and the second message includes a MAC-CE message.

Some examples of the method, apparatuses, and non-transitory computer-readable medium described herein may further include operations, features, means, or instructions for transmitting a second message including a second indication to deactivate the one or more DMRS candidates of the set of DMRS candidates, transmitting a third message including a third indication of at least one DMRS candidate of the set of DMRS candidates remaining activated, where estimating the one or more characteristics of the data channel includes, and estimating the one or more characteristics of the data channel using the at least one DMRS candidate.

In some examples of the method, apparatuses, and non-transitory computer-readable medium described herein, the third message includes a UE-specific DCI message or a GC-DCI message, and the second message includes a MAC-CE message.

Some examples of the method, apparatuses, and non-transitory computer-readable medium described herein may further include operations, features, means, or instructions for identifying a QCL state or a TCI state based on the received message, determining a DMRS candidate of the set of DMRS candidates based on the QCL state or the TCI state, where estimating the one or more characteristics of the data channel includes, and estimating the one or more characteristics of the data channel using the determined DMRS candidate.

In some examples of the method, apparatuses, and non-transitory computer-readable medium described herein, the data channel includes a PDSCH. In some examples of the method, apparatuses, and non-transitory computer-readable medium described herein, the data channel includes a PUSCH.

DETAILED DESCRIPTION

Figure 1:
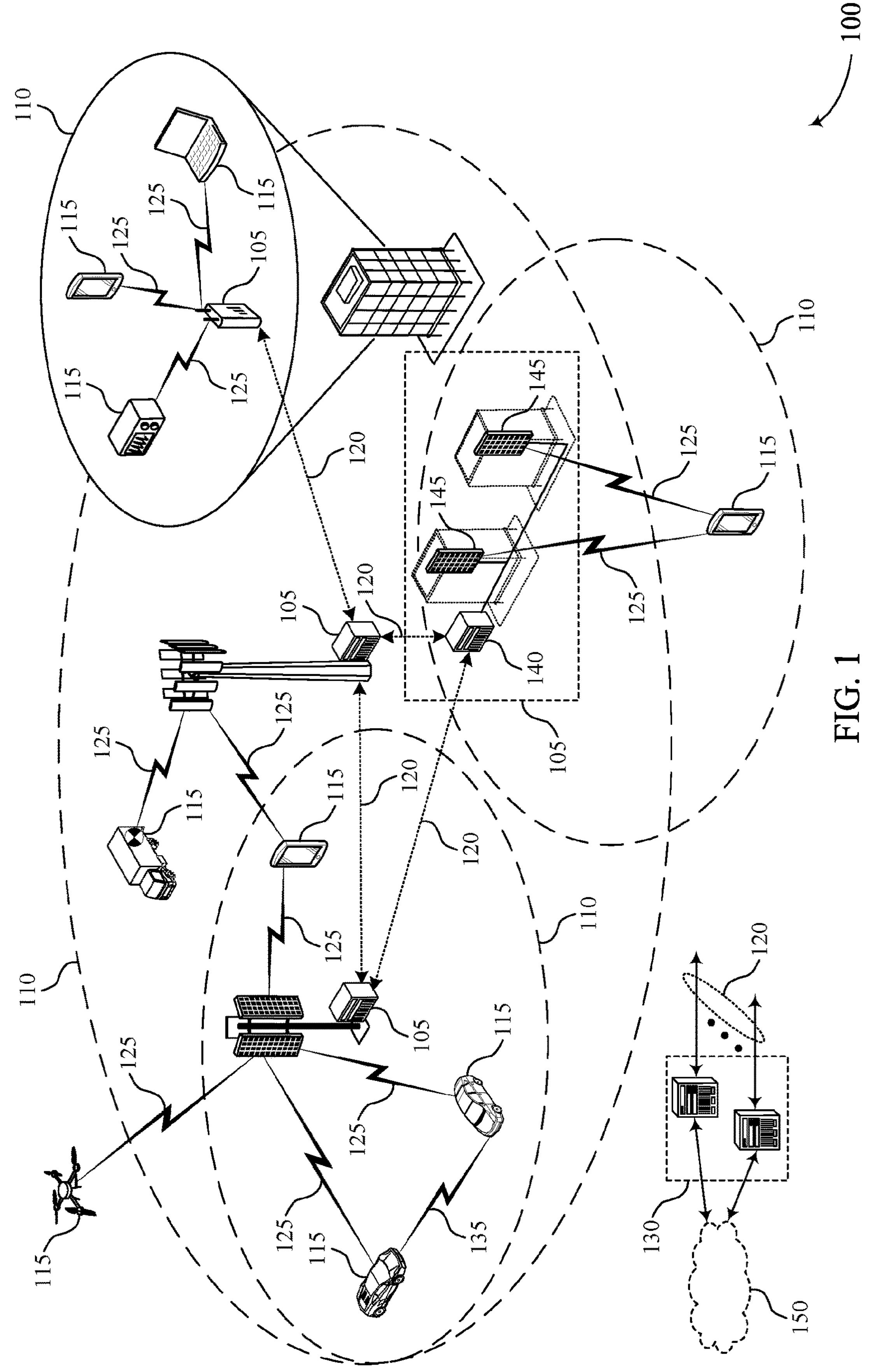
FIGS. 1 and 2 illustrate example of wireless communications systems that support demodulation reference signaling for selective channels in accordance with aspects of the present disclosure.

Some wireless communication systems may include communication devices, such as a user equipment (UE) and a base station, for example, an eNodeBs (eNBs), a next-generation NodeB or a giga-NodeB (either of which may be referred to as a gNB) that may support multiple radio access technologies. Examples of radio access technologies include 4G systems such as Long Term Evolution (LTE) systems and fifth generation (5G) systems which may be referred to as New Radio (NR) systems. The UE and the base stations may communicate with each other over one or more physical channels including a physical control channel and a physical data channel. Examples of a physical control channel include a physical downlink control channel (PDCCH) and a physical uplink control channel (PUCCH), among others. Examples of a physical data channel include a physical downlink shared channel (PDSCH) and a physical uplink shared channel (PUSCH), among others. The UE may, in some examples, perform channel estimation on one or more physical channels to maintain a reliable and efficient link between the UE and the base station. For example, the UE may determine one or more characteristics of a physical data channel (e.g., a PDSCH, a PUSCH) based on demodulation reference signal (DMRS) transmissions from the base station. The channel estimation may also assist in demodulation and decoding of information (e.g., data packets) received over the physical data channel.

In some cases, the UE may be moving at a high speed with respect to the base station. Thus, wireless communications between the UE and the base station may be associated with high-Doppler variation (e.g., a Doppler shift, a Doppler spread, a sparse Doppler profile) and increased multi-path fading effects. The high-Doppler variation and multi-path fading effects may cause variations in both time and frequency such that channel estimation performance by the UE may be less reliable and the wireless communications system may suffer performance degradation.

For example, the UE may communicate with the base station using various radio frequency spectrum bands. The UE may perform channel estimation according to a DMRS candidate. In some examples, the base station may determine a DMRS candidate and transmit a configuration to the UE along with any corresponding data via a physical data channel. The DMRS candidate may be allocated across an entire radio frequency spectrum band (e.g., a wideband). However, different radio frequency spectrum subbands may experience different Doppler variation and multi-path effects. Therefore, different radio frequency spectrum subbands may suffer decreased channel estimation performance.

To increase channel estimation performance, the UE may be configured with multiple DMRS candidates and one or more parameters to use for channel estimation. For example, the base station may determine a set of parameters associated with a set of DMRS candidates for a physical data channel corresponding to a radio frequency spectrum band or a radio frequency spectrum subband on which the base station and the UE are communicating on. The base station may transmit a message (e.g., a control message, a radio resource control (RRC) message, a downlink control information (DCI) message) to the UE indicating the set of DMRS candidates and the set of parameters to use for the channel estimation. The UE may receive the message and may determine the set of parameters associated with the set of DMRS candidates. The UE and the base station may both then communicate via the physical data channel and estimate one or more characteristics of the physical data channel using the set of parameters associated with the set of DMRS candidates.

Additionally, in some cases, the base station may indicate to the UE a DMRS candidate to use for the channel estimation. For example, the base station may transmit control information (e.g., via a DCI message) scheduling a physical data channel and indicating a DMRS candidate of a set of DMRS candidates to use for the channel estimation. Here, the UE may estimate one or more characteristics of the physical data channel using the indicated DMRS candidate. In other cases, the base station may allocate a default DMRS candidate of the set of DMRS candidates and an order of each DMRS candidate in the set of DMRS candidates. The base station may transmit control information scheduling the physical data channel and indicating a differential step from the default DMRS candidate that the UE may use to identify the DMRS candidate to use for the channel estimation. For example, the UE may select a DMRS candidate of the set of DMRS candidates by comparing the indicated differential step to an index of the default DMRS candidate. The UE may, as a result, estimate one or more characteristics of the physical data channel using the selected DMRS candidate.

Aspects of the subject matter described in this disclosure may be implemented to realize one or more of the following potential improvements, among others. The techniques employed by the UE may provide benefits and enhancements to the operation of the UE. For example, operations performed by the UE may provide improvements to channel estimation operations. In some examples, configuring the UE to support multiple DMRS candidates to use when performing channel estimation may provide flexibility for channel estimation at the UE. In some other examples, configuring the UE to support a set of parameters specific to a radio frequency spectrum band or one or multiple radio frequency spectrum subbands to use when performing channel estimation may provide improvements to power consumption, spectral efficiency, and, in some examples, may promote high reliability and low latency channel estimation operations, among other benefits.

Aspects of the disclosure are initially described in the context of wireless communications systems. Aspects of the disclosure are further illustrated by and described with reference to apparatus diagrams, system diagrams, and flowcharts that relate to demodulation reference signaling for selective channels.

FIG. 1 illustrates an example of a wireless communications system 100 that supports demodulation reference signaling for selective channels in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode). A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s=1/(\Delta f_{max} \cdot N_f)$ seconds, where 66 $f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or radio frequency spectrum band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) radio frequency spectrum bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more radio frequency spectrum bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using radio frequency spectrum bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A base station 105 and a UE 115 may communicate information in the wireless communications system 100 over one or more physical channels. For example, the base station 105 may transmit control information to the UE 115 via a downlink control channel (e.g., a PDCCH) and data to the UE 115 via a downlink shared channel (e.g., a PDSCH), and the UE 115 may transmit control information to the base station 105 via an uplink control channel (e.g., a PUCCH) and data to the base station via an uplink shared channel (e.g., a PUSCH). In some examples, a wireless device (e.g., the base station 105 or the UE 115) may transmit one or more reference signals. For example, the base station 105 may transmit reference signals to the UE 115 over a downlink channel, which may enable the UE 115 to perform channel estimation techniques. Such channel estimation techniques may improve decoding or demodulation of data (e.g., control information such as a DCI message) transmitted via the one or more physical channels.

The wireless communications system 100 may support transmission of reference signals to increase an efficiency and a reliability of communications between wireless devices (e.g., a base station 105 and a UE 115). The reference signals may be transmitted from a base station 105 to a UE 115, and vice versa. The reference signals transmitted to a UE 115 may be referred to as downlink reference signals and reference signals transmitted to a base station 105 may be referred to as uplink reference signals. In some examples, the reference signals may be used by the wireless devices to determine characteristics of a physical channel (e.g., a PDSCH, a PUSCH). The characteristics of a physical channel may also be referred to as a channel estimate, a channel condition, or a channel metric.

A reference signal (e.g., a DMRS) may be transmitted over communication resources in accordance with a reference signal configuration (e.g. a set of DMRS candidates). The reference signal configuration may indicate which resource elements are allocated to a reference signal transmission. In some cases, a resource element allocated to a transmission of a reference signal may be referred to as a pilot resource element. A group of resource elements (e.g., contiguous resource elements) within a symbol period allocated to a transmission of a reference signal may be referred to as a pilot symbol. In some cases, a reference signal configuration indicates a temporal spacing between resource elements allocated to a reference signal (e.g., a time density); a frequency spacing between resource elements allocated to a reference signal (e.g., a frequency density); and a power boosting parameter that indicates a power for transmitting the reference signal resource element relative to a power for transmitting a data resource element. Different reference signal configurations may be associated with different combinations of temporal spacing, frequency spacing, and power boosting. For example, a first reference signal configuration may be associated with a first temporal spacing, a first frequency spacing, and a first power boosting and a second reference signal configuration may be associated with the first temporal spacing, the first frequency spacing, and a second power boosting, and so on.

A UE 115 and a base station 105 may use a DMRS candidate to estimate characteristics of a physical channel. In some cases, a DMRS candidate may include all the DMRS symbols in time for a particular frequency. In other cases, a DMRS candidate may include all the DMRS symbols of a radio frequency spectrum band or a radio frequency spectrum subband for a particular symbol time. The wireless communications system 100 may support wireless communications with a UE 115 traveling at high speeds. For example, a base station 105 may communicate with a UE 115 that is traveling at high speeds. While traveling at high speeds, communications between the UE 115 and the base station 105 may be associated with high-Doppler variation (e.g., a Doppler shift, a Doppler spread, a sparse Doppler profile) and increased multi-path fading effects. The high-Doppler variation and multi-path fading effects may cause variations in both time and frequency. In some cases, different radio frequency spectrum subbands or radio frequency spectrum bands may experience different Doppler variation and multi-path effects such that one radio frequency spectrum subband may experience large variations in time or frequency while another radio frequency spectrum subband may experience relatively small variations in time or frequency. A physical channel experiencing large variations in time or frequency may be referred to as a selective channel.

Channel estimation performance of a physical channel may be related to one or more parameters of DMRS candidates associated with the physical channel. For example, channel estimation performance of a physical channel (e.g., a PDSCH) may be related to a DMRS symbol density of the DMRS candidates, an energy per resource element ratio of the DMRS candidates, or a DMRS symbol location of a symbol of the DMRS candidates, or a combination thereof. Additionally, there may be a trade-off between a DMRS symbol density of the DMRS candidates and a throughput of a physical channel. For example, the throughput of a physical channel associated with a high DMRS symbol density may be less than the throughput of a physical channel associated with a low DMRS symbol density. However, communications using the physical channel associated with the higher DMRS symbol density may benefit from increased reliability. A UE 115 may reliably perform channel estimation of a physical channel experiencing small time and frequency variations using one or more DMRS candidates with a relatively low DMRS symbol density. In order to reliably perform channel estimation of a physical channel experiencing large time and frequency variations, a UE 115 may use one or more DMRS candidates with a relatively high DMRS symbol density. Thus, configuring a physical channel with DMRS candidates based on the time and frequency variations of the each subband may improve channel estimation performance (e.g., increased reliability, increased throughput).

A base station 105 may configure a UE 115 with multiple DMRS candidates and one or more parameters specific, to one or multiple radio frequency spectrum subbands or radio frequency spectrum bands, to use for channel estimation. For example, a base station 105 may determine a Doppler variation or a multi-path fading effect associated with communications between the base station 105 and the UE 115. Based on the Doppler variation or multi-path fading effect, the base station 105 may determine a set of parameters associated with a set of DMRS candidates for a physical data channel by which the base station 105 and UE 115 may transmit data transmissions. The set of parameters may correspond to a radio frequency spectrum band or a radio frequency spectrum subband associated with the physical data channel. For example, the set of parameters may correspond to a frequency band or frequency subband experiencing large time and frequency variations.

The base station 105 may transmit a message (e.g., a control message, an RRC message, DCI) to the UE 115 indicating the set of DMRS candidates and the set of parameters to use for channel estimation of the physical data channel. The UE 115 may receive the message and may determine the set of parameters associated with the set of DMRS candidates. In some cases, the UE 115 may then receive a downlink transmission from the base station 105 via the physical data channel and estimate one or more characteristics of the physical data channel using the set of parameters. For example, the UE 115 may estimate a Doppler variation or a multi-path fading effect of the physical channel to properly interpret the symbols of the downlink transmission. In some instances, the UE 115 may transmit an uplink transmission based on the set of parameters associated with the DMRS candidates via the physical data channel. The base station 105 may then use the set of parameters to estimate one or more characteristics of the physical data channel to correctly interpret the symbols of the uplink transmission.

Figure 2:
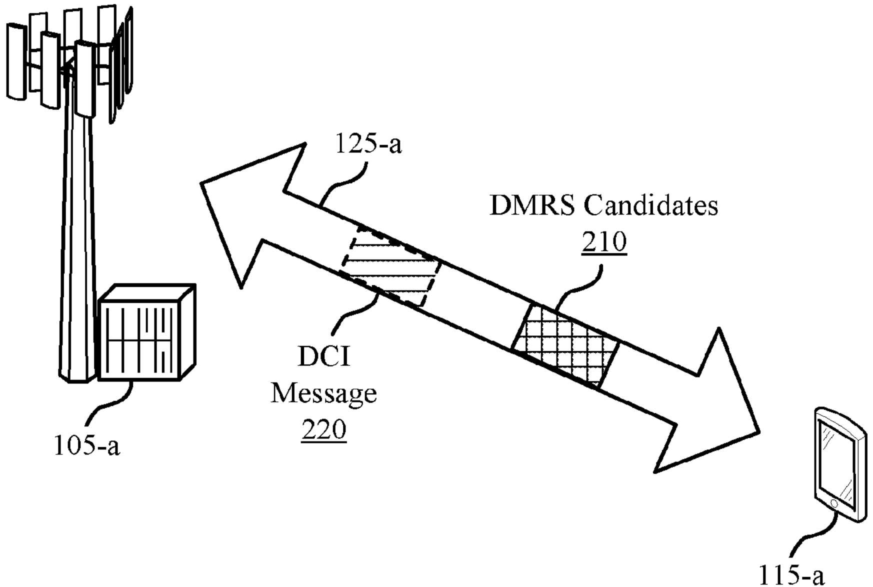

FIG. 2 illustrates an example of a wireless communications system 200 that supports demodulation reference signaling for selective channels in accordance with aspects of the present disclosure. The wireless communications system 200 may implement aspects of the wireless communications system 100. For example, the wireless communications system 200 may include a base station 105-*a* and a UE 115-*a*, which may be examples of a base station 105 and a UE 115 as described with reference to FIG. 1. The base station 105-*a* and the UE 115-*a* may communicate with one another via communication link 125-*a*, which may be an example of a communication link 125 as described with reference to FIG. 1. The wireless communications system 200 may support multiple radio access technologies including 4G systems such as LTE systems, LTE-A systems, or LTE-A Pro systems, and 5G systems, which may be referred to as NR systems.

The base station 105-*a* and the UE 115-*a* may communicate via a physical data channel using a set of DMRS candidates 210. For example, the base station 105-*a* may configure the UE 115-*a* with a set of DMRS candidates 210 and one or more parameters to use for channel estimation of the physical data channel. In some cases, the base station 105-*a* may determine a time variation or a frequency variation associated with the physical data channel. Based on the time and frequency variations, the base station 105-*a* may determine a set of parameters associated with the set of DMRS candidates 210 for the physical data channel. The set of parameters may correspond to a radio frequency spectrum band or a radio frequency spectrum subband associated with the physical data channel. In some cases, the physical data channel may be a PDSCH. In other cases, the physical data channel may be a PUSCH.

The UE 115-*a* may receive a message from the base station 105-*a* that includes the set of DMRS candidates 210. In some cases, the UE 115-*a* may receive an RRC message from the base station 105-*a* that includes the set of DMRS candidates 210. In other cases, the UE 115-*a* may receive a DCI message from the base station 105-*a* that includes the set of DMRS candidates 210. In response to receiving the message, the UE 115-*a* may determine a set of parameters associated with the set of DMRS candidates 210. For example, the UE 115-*a* may determine a number of DMRS symbols of the set of DMRS candidates 210. In some examples, the UE 115-*a* may determine a location of the DMRS symbols in a slot of a downlink transmission or an uplink transmission of the physical data channel. The UE 115-*a* may additionally determine a number of resource elements used for a DMRS symbol. In some cases, the UE 115-*a* may determine which resource elements of the DMRS symbol are reserved for the DMRS information and whether any remaining resource elements may be used for the physical data channel.

The UE 115-*a* may determine an energy per resource element (EPRE) ratio for the DMRS candidates of the set of DMRS candidates 210. The UE 115-*a* may compare the energy used to transmit a DMRS resource element to the energy used to transmit a resource element carrying data to determine the EPRE ratio. In some cases, the UE 115-*a* may determine the one or more parameters associated with the set of DMRS candidates 210 and estimate one or more characteristics of the physical data channel based on the determined parameters.

In some examples, the base station 105-*a* may determine the set of parameters associated with the DMRS candidates 210 and transmit the message including the DMRS candidates and the associated set of parameters to the UE 115-*a*. That is, the base station 105-*a* may allocate one or more of the number of DMRS symbols of the DMRS candidates 210, the location of the DMRS symbols, the number of resource elements used for a DMRS symbol, the EPRE ratio for the DMRS candidates of the set of DMRS candidates 210, and may reserve a number of resource elements of a DMRS symbol for the physical data channel. One or more of the base station 105-*a* and the UE 115-*a* may then estimate one or more characteristics of the physical data channel based on one or more of the parameters allocated by the base station 105-*a*.

The UE 115-*a* may determine a size of a radio frequency spectrum subband associated with the physical data channel. In some cases, the UE 115-*a* may determine the size of the radio frequency spectrum subband based on one or more parameters of the set of parameters associated with the set of DMRS candidates 210. For example, the UE 115-*a* may determine the size of the radio frequency spectrum subband by determining the locations of the DMRS symbols associated with the set of DMRS candidates 210. In some examples, the size of the radio frequency spectrum subband is UE-specific. The UE 115-*a* may additionally determine a default size of the radio frequency spectrum subband and assign the default size to the radio frequency spectrum subband. Here the UE 115-*a* may estimate one or more characteristics of the physical data channel based on the default size of the radio frequency spectrum subband.

In some examples, the UE 115-*a* may receive a report, such as channel state information (CSI) report indicating a size of the radio frequency spectrum subband. The UE 115-*a* may identify the size of the radio frequency spectrum subband from the CSI report and estimate one or more characteristics of the physical data channel based on the size of the radio frequency spectrum subband. The set of DMRS candidates 210 may, in some examples, be associated with a physical resource block (PRB) group. The UE 115-*a* may determine a size of the PRB group and may determine that the size of the radio frequency spectrum subband is the same as the size of the PRB group. In some cases, the set of DMRS candidates 210 may be associated with a PRB bundle. The UE 115-*a* may determine a size of the PRB bundle and may determine that the size of the radio frequency spectrum subband is the same as the size of the PRB bundle.

The UE 115-*a* may decode a downlink transmission from the base station 105-*a* based on a transmission configuration indicator (TCI) state (e.g., a beam configuration). For example, the UE 115-*a* may decode the message indicating the DMRS candidates 210 based on a TCI state of the message. In some cases, each TCI state may correspond to a quasi-colocation (QCL) type (QCL type A/B/C/D). For example, the UE 115-*a* may assume that certain channel estimations may be similar for transmissions associated with a same TCI state (e.g., due to the QCL type). In some cases, the base station 105-*a* may transmit different DMRS symbols of the set of DMRS candidates 210 using the same or different TCI states (e.g., from different TRPs associated with the base station 105-*a*).

The base station 105-*a* may transmit different DMRS symbols of the set of DMRS candidates 210 using same or different QCL types. The UE 115-*a* may determine whether two adjacent DMRS symbols of the set of DMRS candidates 210 were transmitted using the same or different QCL types. In some cases, the UE 115-*a* may determine that the two adjacent DMRS symbols were transmitted using the same QCL types. Here, the UE 115-*a* may estimate one or more characteristics of the physical data channel based on the adjacent DMRS symbols being transmitted using the same QCL types. In other cases, the UE 115-*a* may determine that the two adjacent DMRS symbols were transmitted using different QCL types. Here, the UE 115-*a* may estimate one or more characteristics of the physical data channel based on the adjacent DMRS symbols being transmitted using different QCL types.

The base station 105-*a* may transmit the message including the set of DMRS candidates 210 according to a TCI state or according to a QCL state (e.g., a QCL type). In some cases, the UE 115-*a* may identify the TCI state or the QCL state of the of the received message. In some examples, the UE 115-*a* may determine that one or more DMRS candidates of the set of DMRS candidates 210 are linked to the identified TCI state or QCL state. In some examples, the UE 115-*a* may determine that the one or more DMRS candidates are linked to the identified TCI state of QCL state based on a set of predetermined rules stored by the UE 115-*a*. In other examples, the UE 115-*a* may determine that the one or more DMRS candidates are linked to the identified TCI state of QCL state based on a configured set of rules (e.g., configured by an RRC message). The UE 115-*a* may estimate one or more characteristics of the physical data channel using the one or more determined DMRS candidates.

In some examples, the base station 105-*a* may transmit a DCI message 220 to the UE 115-*a* that schedules a downlink data channel or an uplink data channel. The DCI message 220 may indicate a DMRS candidate of the set of DMRS candidates 210 to use for channel estimation. The UE 115-*a* may identify the DMRS candidate based on receiving the DCI message 220 and estimate one or more characteristics of the physical data channel using the indicated DMRS candidate. In some cases, the base station 105-*b* may also identify the indicated DMRS candidate and estimate one or more characteristics of the physical data channel using the indicated DMRS candidate. In some instances, the DCI message 220 may be a group common-DCI (GC-DCI) message associated with a group of UEs 115.

The UE 115-*a* may determine a default DMRS candidate of the set of DMRS candidates 210. For example, the base station 105-*a* may allocate a default DMRS candidate of the set of DMRS candidates 210. In some examples, the base station 105-*b* may transmit an indication of the default DMRS candidate via an RRC message. In some cases, the UE 115-*a* and the base station 105-*a* may assume to use the default DMRS candidate for channel estimation. Here, the UE 115-*a* and the base station 105-*a* may estimate one or more characteristics of the physical data channel using the default DMRS candidate.

The UE 115-*a* may determine an order of each DMRS candidate in the set of DMRS candidates 210. For example, each DMRS candidate in the set of DMRS candidates 210 may be associated with a DMRS symbol density. In some instances, the base station 105-*a* may order the DMRS candidates according to increasing DMRS symbol density or according to decreasing DMRS symbol density. The base station 105-*a* may then transmit the ordered set of DMRS candidates 210 to the UE 115-*a*. Subsequently, the UE 115-*a* and the base station 105-*a* may estimate one or more characteristics of the physical data channel based on the ordered DMRS candidates 210. In some cases, each DMRS candidate in the set of DMRS candidates 210 may be associated with an EPRE ratio. In some examples, the base station 105-*a* may order the DMRS candidates according to increasing EPRE ratio or according to decreasing EPRE ratio. The base station 105-*a* may then transmit the ordered set of DMRS candidates 210 to the UE 115-*a*. Subsequently, the UE 115-*a* and the base station 105-*a* may estimate one or more characteristics of the physical data channel based on the ordered DMRS candidates 210.

The base station 105-*a* may transmit the DCI message 220 to the UE 115-*a* indicating a differential DMRS candidate index-step. The UE 115-*a* may use the differential DMRS candidate index-step to select a DMRS candidate of the set of DMRS candidates 210 to use for channel estimation. For example, the UE 115-*a* may determine a default DMRS candidate of the set of DMRS candidates 210 and may determine an order of each DMRS candidates in the set of DMRS candidates 210.

Each of the DMRS candidates may be associated with an index based on the order of the DMRS candidates. For example, the UE 115-*a* may determine that the default DMRS candidate is the third DMRS candidate of the ordered set of DMRS candidates 210 and associated with an index value 3.

The UE 115-*a* may select a DMRS candidate to use for channel estimation by comparing the differential DMRS candidate index-step to the index of the default DMRS candidate. For example, if the differential DMRS candidate index-step is a value of 1 and the default DMRS candidate is associate with an index value 3, the UE 115-*a* may select the fourth DMRS candidate of the ordered set of DMRS candidates 210 associated with an index value 4. The UE 115-*a* and the base station 105-*a* may then estimate on or more characteristics of the physical data channel using the selected DMRS candidate. In some cases, the base station 105-*a* may transmit the DCI message 220 to the UE 115-*a* as part of a GC-DCI message associated with a group of UEs 115 as described herein.

The base station 105-*a* may activate or deactivate one or more of the DMRS candidates 210. For example, the base station 105-*a* may activate or deactivate the one or more DMRS candidates 210 via a MAC-control element (MAC-CE) command. In some example, the base station 105-*a* may activate one or more DMRS candidates 210. Here, the base station 105 may transmit an indication in the DCI message 220 identifying one of the activated DMRS candidates 210 to use for channel estimation.

The UE 115-*a* may estimate one or more characteristics of the physical data channel using the indicated DMRS candidate 210. In some examples, the base station 105-*a* may deactivate one or more DMRS candidates 210 (e.g., via a MAC-CE command). Here, the UE 115-*a* may assume that the remaining DMRS candidates 210 are active. The base station 105-*a* may then transmit an indication in the DCI message 220 identifying one of the remaining DMRS candidates 210 to use for channel estimation. The UE 115-*a* may estimate one or more characteristics of the physical data channel using the indicated DMRS candidate 210. In some cases, the DCI message 220 is UE-specific. In other cases, the DCI message 220 is a GC-DCI message intended for a group of UEs 115.

The wireless communications system 200 may, as a result, include features for improvements to channel estimation operations for selective channels and, in some examples, may promote high reliability and low latency wireless communications. The wireless communications system 200 may also include features for improvements to decoding physical channels such as PDSCH and PUSCH by improving channel estimation operations for selective channels as described herein.

Figure 3:
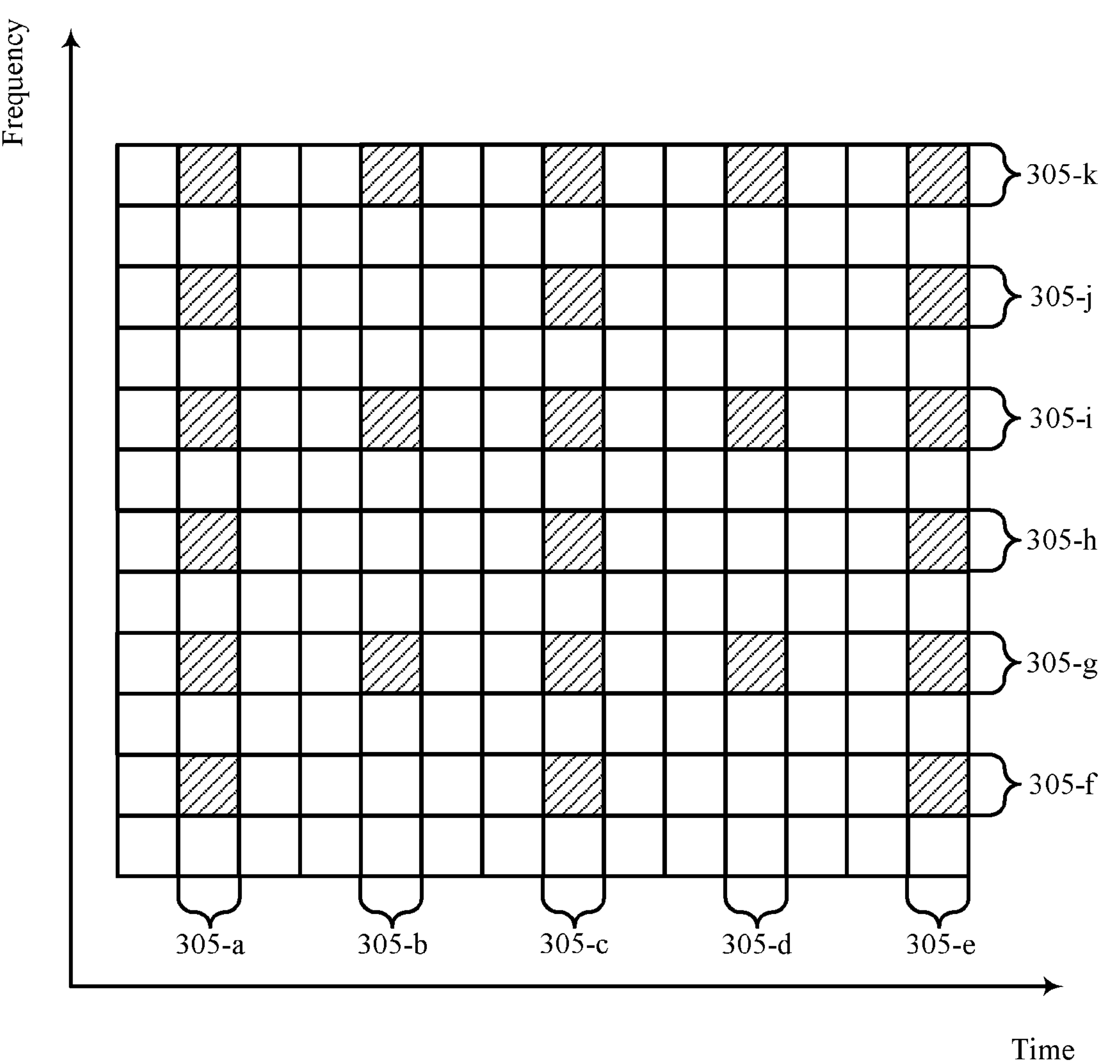
FIG. 3 illustrates an example of a demodulation reference signal (DMRS) scheme that supports demodulation reference signaling for selective channels in accordance with aspects of the present disclosure.
Figure 3:

FIG. 3 illustrates an example of a DMRS scheme 300 that supports demodulation reference signaling for selective channels in accordance with aspects of the present disclosure. The DMRS scheme 300 may implement aspects of the wireless communications system 100 and 200 described with reference to FIGS. 1 and 2, respectively. The DMRS scheme 300 may be based on a configuration by a base station 105 or a UE 115, and implemented by the base station 105 or the UE 115 and may promote high reliability and low latency channel estimation operations in a wireless communications system. The DMRS scheme 300 may also be based on a configuration by the base station 105 or the UE 115, and implemented by the base station 105 or the UE 115 to reduce power consumption for the UE 115 when performing channel estimation operations, among other benefits.

The DMRS scheme 300 may illustrate an example slot of a downlink transmission or an uplink transmission. The DMRS scheme 300 may correspond to a resource block, which may include 14 OFDM symbols in a time domain and 12 subcarriers in a frequency domain. A bandwidth of each subcarrier may be defined by a subcarrier spacing, where the subcarrier spacing may be a distance between subcarriers in the frequency domain. It should be noted that the DMRS scheme 300 depicts a possible implementation of a slot, and that other implementations including a different number of OFDM symbols or subcarriers are possible.

The DMRS scheme 300 may include multiple DMRS symbols 310 and multiple data symbols 315. Additionally, the DMRS scheme 300 may include DMRS candidates 305. In some cases, a DMRS candidate may defined as all the DMRS symbols 310 in a time domain for a particular frequency (e.g., DMRS candidates 305-*f*, 305-*g*, 305-*h*, 305-*i*, 305-*j*, 305-*k*). For example, a DMRS candidate 305-*f* may be defined to include three DMRS symbols 310 in a time domain corresponding to the second frequency bandwidth of DMRS scheme 300. In other cases, a DMRS candidate 305 may be defined to include all the DMRS symbols 310 of a radio frequency spectrum band or a radio frequency spectrum subband for a particular OFDM symbol in a time domain (e.g., DMRS candidates 305-*a*, 305-*b*, 305-*c*, 305-*d*, 305-*e*). For example, a DMRS candidate 305-*a* may be defined to include five DMRS symbols 310 in frequency corresponding to the second OFDM symbol in time of the DMRS scheme 300.

A DMRS candidate 305 may be associated with one or more parameters. In some examples, a DMRS candidate 305 may include a number of DMRS symbols 310. For example, a DMRS candidate 305-*f* may include three DMRS symbols 310. Each DMRS symbol 310 may be associated with a location in a slot. In some examples, a parameter of a DMRS candidate 305 may indicate the number of DMRS symbols 310 of a DMRS candidate 305 and their locations in the slot. In some examples, each DMRS symbol 310 may include one or more resource elements. A parameter of a DMRS candidate 305 may indicate a number or resource elements associated with the DMRS candidate 305. In some examples, a parameter of the DMRS candidate 305 may indicate whether one or more of the resource elements associated with the DMRS candidate 305 are reserved for a physical data channel (e.g. a PDSCH, a PUSCH). In some examples, a DMRS candidate 305 may be associated with an EPRE ratio. A parameter of the DMRS candidate 305 may indicate an EPRE ratio. In some cases, the UE 115 or the base station 105 may determine one or more parameters associated with the DMRS candidate 305 and may estimate one or more characteristics of a physical data channel based on the one or more parameters.

The base station 105 may indicate at least one DMRS candidate 305 to use for channel estimation. For example, the base station 105 may transmit a DCI message that indicates to the UE 115 to use a DMRS candidate 305-*j* for channel estimation. The UE 115 may then select the DMRS candidate 305-*j* to estimate one or more characteristics of a physical data channel. The base station 105 may configure a DMRS candidate 305 (e.g., via RRC signaling) as a default DMRS candidate 305 for use in channel estimation. For example, the base station 105 may configure the DMRS candidate 305-*c* to be the default DMRS candidate 305. In some examples, the DMRS candidates 305 may be ordered according to a DMRS symbol density of the DMRS candidates 305 (e.g., an increasing DMRS symbol density, a decreasing DMRS symbol density) or an EPRE ratio of the DMRS candidates 305. Each DMRS candidate 305 may be associated with an index value. For example, the DMRS candidate 305-*a* may be associated with an index value 0, the DMRS candidate 305-*b* may be associated with an index value 1, the DMRS candidate 305-*c* may be associated with an index value 2, and so on.

The base station 105 may transmit a DCI message to the UE 115 indicating a DMRS candidate index-step to use to select a DMRS candidate 305 for channel estimation. For example, if the DCI message indicates a DMRS candidate index-step of −1, the UE 115 may compare the index value of the default DMRS candidate 305-*c* to the DMRS candidate index-step to select the DMRS candidate 305 to use for channel estimation. In this example, the UE 115 may identify that the index value of the default DMRS candidate 305-*c* is 2 and the DMRS candidate index-step is −1. Therefore, the UE 115 may select the DMRS candidate 305-*b* having the index value of 1. The UE 115 may then estimate one or more characteristics of a physical data channel using the selected DMRS candidate 305-*b*. The DMRS candidate index-step may be positive, negative, or zero.

The base station 105 may activate or deactivate one or more DMRS candidates 305. For example, the base station 105 may transmit a message to the UE 115 to activate a DMRS candidate 305-*a* and a DMRS candidate 305-*d*. In some cases, the message may be a MAC-CE command. The base station 105 may transmit a DCI message that indicates one of the DMRS candidate 305-*a* or the DMRS candidate 305-*d* to use for channel estimation. The UE 115 may then estimate one or more characteristics of the physical data channel using the indicated DMRS candidate 305. In some examples, the base station 105 may transmit a MAC-CE command to the UE 115 to deactivate one or more DMRS candidates 305-*a*, 305-*b*, 305-*d*, 305-*e*, 305-*f*, 305-*h*, 305-*i*, and 305-*j*. The base station 105 may transmit a DCI message that indicates one of the DMRS candidates 305-*c*, 305-*g*, 305-*j*, or 305-*k* to use for the channel estimation. The UE 115 may then estimate one or more characteristics of the physical data channel using the indicated DMRS candidate 305. In some cases, the DCI message may be UE-specific. In other cases, the DCI message may be a GC-DCI message intended for a group of UEs 115.

In some examples, a DMRS candidate 305 may be linked to a field of a control message. For example, a DMRS candidate 305 may be linked to a QCL state or a TCI state of indicated by an RRC message or a DCI message. The base station 105 or the UE 115 may identify the QCL state or the TCI state by decoding the control message. In some cases, the base station 105 or the UE 115 may determine the DMRS candidate 305 linked to the identified QCL state or TCI state and may estimate one or more characteristics of the physical data channel using the determined DMRS candidate 305. In some examples, the identified QCL state or TCI state may be linked to multiple DMRS candidates 305. Here, the base station 105 or the UE 115 may determine the multiple DMRS candidates 305 and estimate one or more characteristics of the physical data channel (e.g., a PDSCH, a PUSCH) using the multiple determined DMRS candidates.

Figure 4:
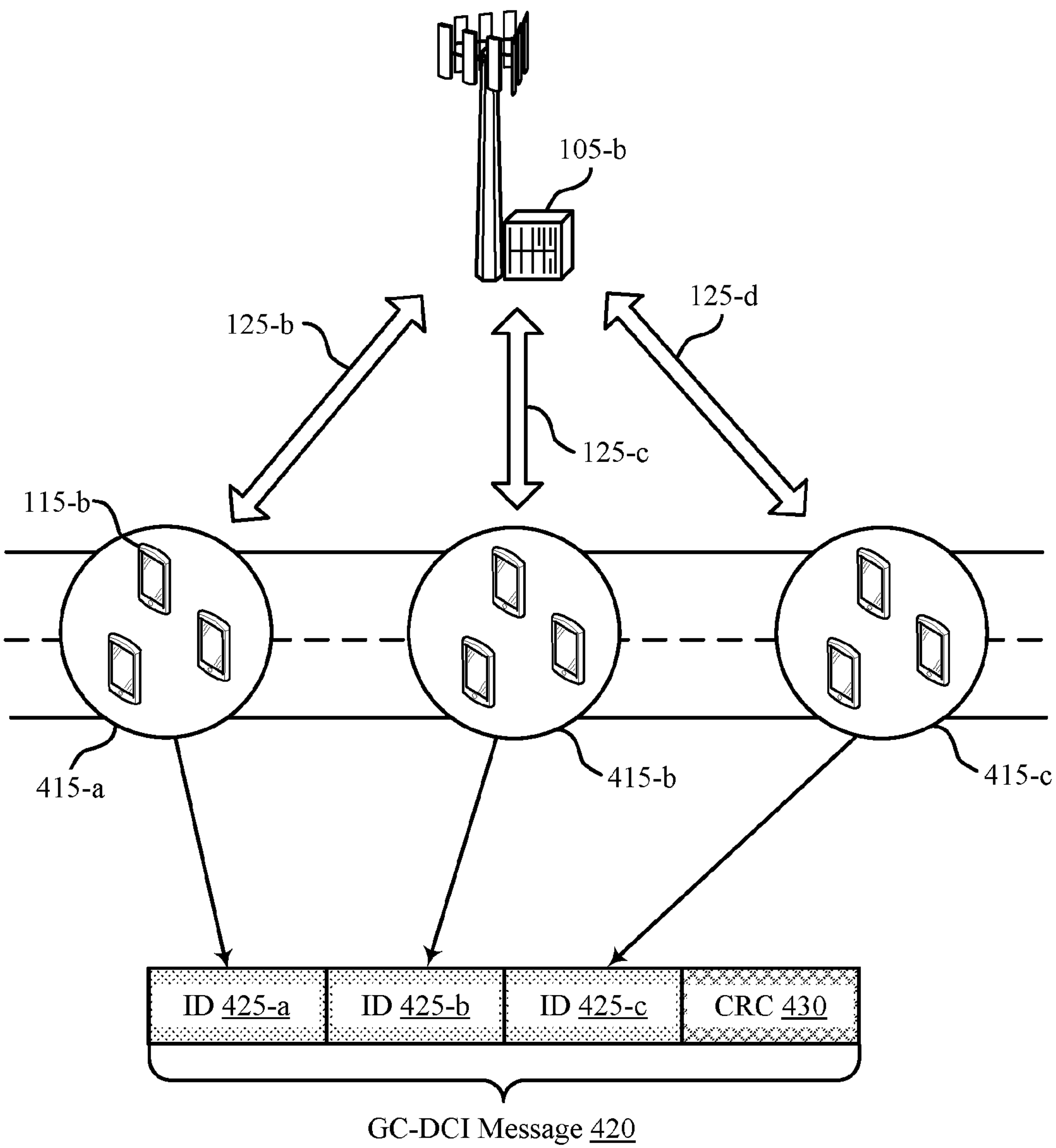
FIG. 4 illustrates an example of a wireless communications system that supports demodulation reference signaling for selective channels in accordance with aspects of the present disclosure.

FIG. 4 illustrates an example of a wireless communications system 400 that supports demodulation reference signaling for selective channels in accordance with aspects of the present disclosure. The wireless communications system 400 may implement aspects of the wireless communications systems 100 or 200. For example, the wireless communications system 400 may include a base station 105-*b*, which may be an example of a base station as described herein. The wireless communications system 400 may also include one or more groups of UEs 415. A group of UEs 415 may include one or more UEs 115 as described herein. The base station 105-*b* and the one or more groups of UEs 415 may communicate with one another via communication links 125, which may be an example of a communication link 125 as described with reference to FIG. 1. For example, the base station 105-*b* may communicate with a group of UEs 415-*a* via communication link 125-*b*, a group of UEs 415-*b* via communication link 125-*c*, and a group of UEs 415-*c* via communication link 125-*d*.

The base station 105-*b* may support communications with the one or more groups of UEs 415. In some cases, one or more UEs 115 may travel relative to the base station 105-*b* such that each UE 115 experiences a similar Doppler variation or multi-path fading effect, or both. Here, the base station 105-*b* may cluster two or more UEs 115 into a group of UEs 415 and may assign the group of UEs 415 an identifier (ID) 425. For example, the base station 105-*b* may create a group of UEs 415-*a* and may assign the group of UEs 415-*a* a first ID 415-*a*. The base station 105-*b* may, additionally or alternatively, create a group of UEs 415-*b* and may assign the group of UEs 415-*b* a second ID 425-*b*. Similarly, the base station 105-*b* may create a group of UEs 415-*c* and may assign the group of UEs 415-*c* a third ID 425-*c*. The base station 105-*b* may use the IDs 425 to differentiate between the groups of UEs 415 when communicating with the groups of UEs 415.

The base station 105-*b* may configure a group of UEs 415 with multiple DMRS candidates and a set of parameters specific to a radio frequency spectrum band or one or multiple radio frequency spectrum subbands to use for channel estimation. In some cases, the base station 105-*b* may configure each group of UEs 415 with a different set of DMRS candidates and a different set of parameters associated with the set of DMRS candidates. In other cases, the base station may configure one or more groups of UEs 415 with a same set of DMRS candidates and a same set of parameters associated with the set of DMRS candidates. For example, the base station may configure each group of UEs 415 with different set of DMRS candidates and different set of parameters associated with the set of DMRS candidates based on a time and a frequency variation that each group of UEs 415 is experiencing.

The base station 105-*b* may transmit a DCI message to each group of UEs 415 as part of a GC-DCI message 420. The GC-DCI message 420 may include a set of DCI fields, wherein each DCI field identifies an ID 425 of a group of UEs 415. For example, the set of DCI fields may include a first DCI field corresponding to an ID 425-*a* associated with the first group of UEs 415-*a*; a second DCI field corresponding to an ID 425-*b* associated with a second group of UEs 415-*b*; and a third DCI field corresponding to an ID 425-*c* associated with a third group of UEs 415-*c*. The GC-DCI message 420 may also include a cyclic redundancy check (CRC) 430. In some examples, each group of UEs 415 may receive the GC-DCI message 420 and decode a DCI field corresponding to the ID 425 associated with the group of UEs 415.

The base station 105-*b* may indicate a DMRS candidate to use for channel estimation to a group of UEs 415. For example, the base station 105-*b* may transmit the GC-DCI message 420, which may schedule a first data channel for a first group of UEs 415-*a*, a second data channel for a second group of UEs 415-*b*, and a third data channel for a third group of UEs 415-*c*. The first group of UEs 415-*a* may be associated with a first ID 425-*a*, the second group of UEs 415-*b* may be associated with a second ID 425-*b*, and the third group of UEs 415-*c* may be associated with a third ID 425-*c*. The GC-DCI message 420 may indicate to the first group of UEs 415-*a*, a DMRS candidate to use for channel estimation. Here, the base station 105-*b* and the first group of UEs 415-*a* may communicate via the first data channel and may estimate one or more characteristics of the first data channel using the selected DMRS candidate. The GC-DCI message 420 may, additionally or alternatively, indicate to the second group of UEs 415-*b*, a DMRS candidate to use for channel estimation. Here, the base station 105-*b* and the second group of UEs 415-*b* may communicate via the second data channel and may estimate one or more characteristics of the second data channel using the selected DMRS candidate. The GC-DCI message 420 may similarly indicate to the third group of UEs 415-*c*, a DMRS candidate to use for channel estimation. Here, the base station 105-*b* and the third group of UEs 415-*c* may communicate via the third data channel and may estimate one or more characteristics of the third data channel using the selected DMRS candidate.

Alternatively, the base station 105-*b* may indicate a DMRS candidate differential index-step to the group of UEs 415 to use to select a DMRS candidate for channel estimation. For example, the base station 105-*b* may configure (e.g., via RRC signaling) each group of UEs 415 with a set of DMRS candidates. The base station 105-*b* may also determine a default DMRS candidate of the set of DMRS candidates for the group of UEs 415 to use for channel estimation and transmit an indication (e.g., an RRC message) of the default DMRS candidates to each corresponding group of UEs 415. In some cases, the default DMRS candidate for each group of UEs 415 may be different.

In some examples, each set of DMRS candidates may be ordered (e.g., by a group of UEs 415, by the base station 105-*b*) according to a DMRS symbol density (e.g., an increasing DMRS symbol density, a decreasing DMRS symbol density) or an EPRE ratio of the DMRS candidates of the set of DMRS candidates. Additionally, each DMRS candidate of a set of DMRS candidates may be associated with an index corresponding to the order of the DMRS candidates. The GC-DCI message 420 may indicate to each group of UEs 415 a DMRS candidate differential index-step that each group of UEs 415 may use to identify a DMRS candidate to use for channel estimation.

The group of UEs 415-*a* may, for example, select a DMRS candidate of the set of DMRS candidates by comparing the DMRS candidate differential index-step to an index of the default DMRS candidate associated with the first group of UEs 415-*a*. Here, the group of UEs 415-*a* and the base station 105-*b* may estimate one or more characteristics of the data channel using the selected DMRS candidate. Likewise, the second group of UEs 415-*b* may select a DMRS candidate of the set of DMRS candidates by comparing the DMRS candidate differential index-step to an index of the default DMRS candidate associated with the second group of UEs 415-*a*, and the third group of UEs 415-*c* may select a DMRS candidate of the set of DMRS candidates by comparing the DMRS candidate differential index-step to an index of the default DMRS candidate associated with the third group of UEs 415-*c*.

The base station 105-*b* may transmit the GC-DCI message 420 periodically. In some cases, one or more UEs 115 of a group of UEs 415 may miss the GC-DCI message 420 transmitted by the base station 105-*b*. That is, a UE 115 may receive the GC-DCI message 420 but incorrectly decode the GC-DCI message 420, or the UE 115 may not monitor for the GC-DCI message 420 when it is transmitted by the base station 105-*b*. Here, the UE 115 may select a DMRS candidate to use for channel estimation different from a DMRS candidate indicated by the missed GC-DCI message 420. To account for the missed GC-DCI message 420, a base station 105-*b* or a UE 115 of a group of UEs 415 may perform channel estimation based on parameters of a set of DMRS candidates. For example, a UE 115-*b* or a base station 105-*b* may determine a transport block (TB) size of a data channel based on a DMRS symbol density of a DMRS candidate of the set of DMRS candidates. In some cases, the UE 115-*b* or the base station 105-*b* may identify a DMRS candidate of the set of DMRS candidates having a highest DMRS symbol density. The UE 115-*b* or the base station 105-*b* may then determine the TB size of the data channel based on the identified DMRS candidate having the highest DMRS symbol density. Subsequently, the UE 115-*b* or the base station 105-*b* may estimate one or more characteristics of a data channel using the identified DMRS candidate according to the determined TB size.

In other cases, the UE 115-*b* or the base station 105-*b* may identify a DMRS candidate of the set of DMRS candidates having a lowest DMRS symbol density. The UE 115-*b* or the base station 105-*b* may then determine the TB size of the data channel based on the identified DMRS candidate having the lowest DMRS symbol density. Subsequently, the UE 115-*b* or the base station 105-*b* may estimate one or more characteristics of a data channel using the identified DMRS candidate according to the determined TB size. In some examples, the UE 115-*b* or the base station 105-*b* may perform channel estimation of a data channel by blindly selecting a DMRS candidate of the set of DMRS candidates based on the UE 115-*b* missing the GC-DCI message 420. The described techniques may, as a result, include features for improvements to channel estimation operations for selective channels and, in some examples, may promote high reliability and low latency wireless communications in various system, such as 4G and 5G systems, among other benefits.

Figure 5:
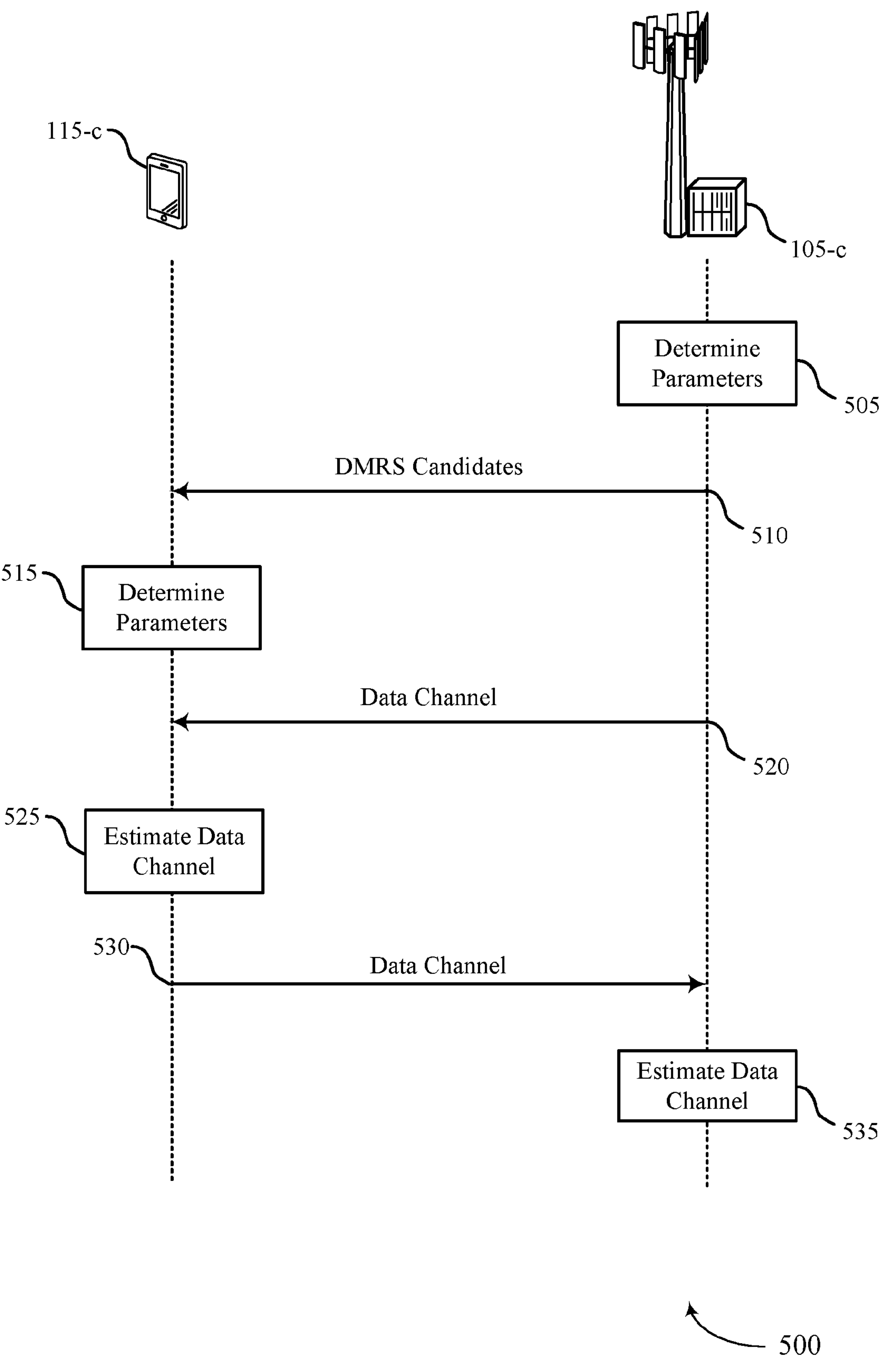
FIG. 5 illustrates an example of a process flow that supports demodulation reference signaling for selective channels in accordance with aspects of the present disclosure.

FIG. 5 illustrates an example of a process flow 500 that supports demodulation reference signaling for selective channels in accordance with aspects of the present disclosure. The process flow 500 may implement aspects of the wireless communications system 100 and 200 described with reference to FIGS. 1 and 2, respectively. The process flow 500 may be based on a configuration by a base station 105-*c* or a UE 115-*c*, and implemented by the UE 115-*c* and may promote high reliability and low latency channel estimation operations in a wireless communications system. The process flow 500 may also be based on a configuration by the base station 105-*c* or the UE 115-*c*, and implemented by the UE 115-*c* to reduce power consumption for the UE 115-*c* when performing channel estimation operations, among other benefits.

The base station 105-*c* and the UE 115-*c* may be examples of a base station 105 and a UE 115, as described with reference to FIGS. 1 through 4. In the following description of the process flow 500, the operations between the base station 105-*c* and the UE 115-*c* may be transmitted in a different order than the example order shown, or the operations performed by the base station 105-*c* and the UE 115-*c* may be performed in different orders or at different times. Some operations may also be omitted from the process flow 500, and other operations may be added to the process flow 500.

At 505, the base station 105-*c* may determine a set of parameters associated with a set of DMRS candidates. The set of parameters may correspond to a radio frequency spectrum band or a radio frequency spectrum subband associated with a data channel. The data channel may be a PDSCH. In some cases, the base station 105-*c* may allocate a size of the radio frequency spectrum subband or the radio frequency spectrum band. Here, the set of parameters may correspond to the radio frequency spectrum band or the radio frequency spectrum subband may be based on the size of the radio frequency spectrum subband or the radio frequency spectrum band.

At 510, the base station 105-*c* may transmit a message including the set of DMRS candidates including the set of parameters may corresponding to the radio frequency spectrum band or the radio frequency spectrum subband associated with the data channel (e.g., a PDSCH). In some cases, the base station 105-*c* may message may be an RRC message. In other cases, the message may be DCI. At 515, the UE 115-*c* may receive the message including the set of DMRS candidates and may determine the set of parameters associated with the set of DMRS candidates based on the received message. In some cases the UE 115-*c* may receive the message via RRC signaling. In other cases, the UE 115-*c* may receive the message via DCI signaling.

At 520, the base station 105-*c* may transmit a downlink transmission via the data channel. For example, the base station 105-*c* may transmit a downlink data transmission via a PDSCH. The base station 105-*c* may transmit the downlink transmission according to the set of parameters associated with the DMRS candidates. At 525, the UE 115-*c* may estimate one or more characteristics of the data channel (e.g., a PDSCH) using the set of parameters associated with the set of DMRS candidates. At 530, the UE 115-*c* may transmit an uplink transmission via a data channel (e.g., a PUSCH). The UE 115-*c* may transmit the uplink transmission according to the set of parameters associated with the set of DMRS candidates. At 535, the base station 105-*c* may estimate one or more characteristics of the data channel (e.g., a PUSCH) using the set of parameters associated with the set of DMRS candidates.

Figure 6:
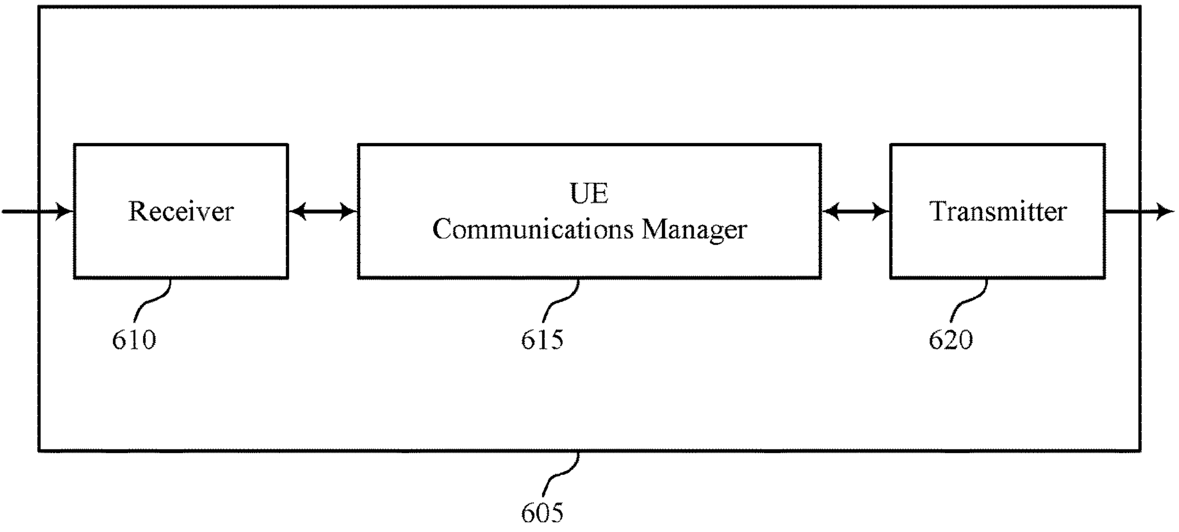
FIGS. 6 and 7 show block diagrams of devices that support demodulation reference signaling for selective channels in accordance with aspects of the present disclosure.

FIG. 6 shows a block diagram 600 of a device 605 that supports demodulation reference signaling for selective channels in accordance with aspects of the present disclosure. The device 605 may be an example of aspects of a UE 115 as described herein. The device 605 may include a receiver 610, a UE communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to demodulation reference signaling for selective channels, etc.). Information may be passed on to other components of the device 605. The receiver 610 may be an example of aspects of the transceiver 920 described with reference to FIG. 9. The receiver 610 may utilize a single antenna or a set of antennas.

The UE communications manager 615 may receive a message including an indication of a set of DMRS candidates for a data channel, determine a set of parameters associated with the set of DMRS candidates based on the received message, the set of parameters corresponding to a radio frequency spectrum subband or a radio frequency spectrum band associated with the data channel, and estimate one or more characteristics of the data channel using the set of parameters associated with the set of DMRS candidates. The UE communications manager 615 may be an example of aspects of the UE communications manager 910 described herein.

The UE communications manager 615 as described herein may be implemented to realize one or more potential improvements. At least one implementation may enable the UE communications manager 615 to determine a set of parameters associated with a set of DMRS candidates and estimate one or more characteristics of a data channel (e.g., a PUSCH) using the set of parameters associated with the set of DMRS candidates. The set of parameters corresponding to a radio frequency spectrum subband or a radio frequency spectrum band (e.g., a wideband) associated with the data channel. Based on implementing the radio frequency spectrum subband or the radio frequency spectrum band parameters as described herein, one or more processors of the device 605 (e.g., processor(s) controlling or incorporated with the UE communications manager 615) may experience reduce power consumption and promote high reliability and low latency wireless communications, among other benefits.

The UE communications manager 615, or its sub-components, may be implemented in hardware, code (e.g., software or firmware) executed by a processor, or any combination thereof. If implemented in code executed by a processor, the functions of the UE communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The UE communications manager 615, or its sub-components, may be physically located at various positions, including being distributed such that portions of functions are implemented at different physical locations by one or more physical components. In some examples, the UE communications manager 615, or its sub-components, may be a separate and distinct component in accordance with various aspects of the present disclosure. In some examples, the UE communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
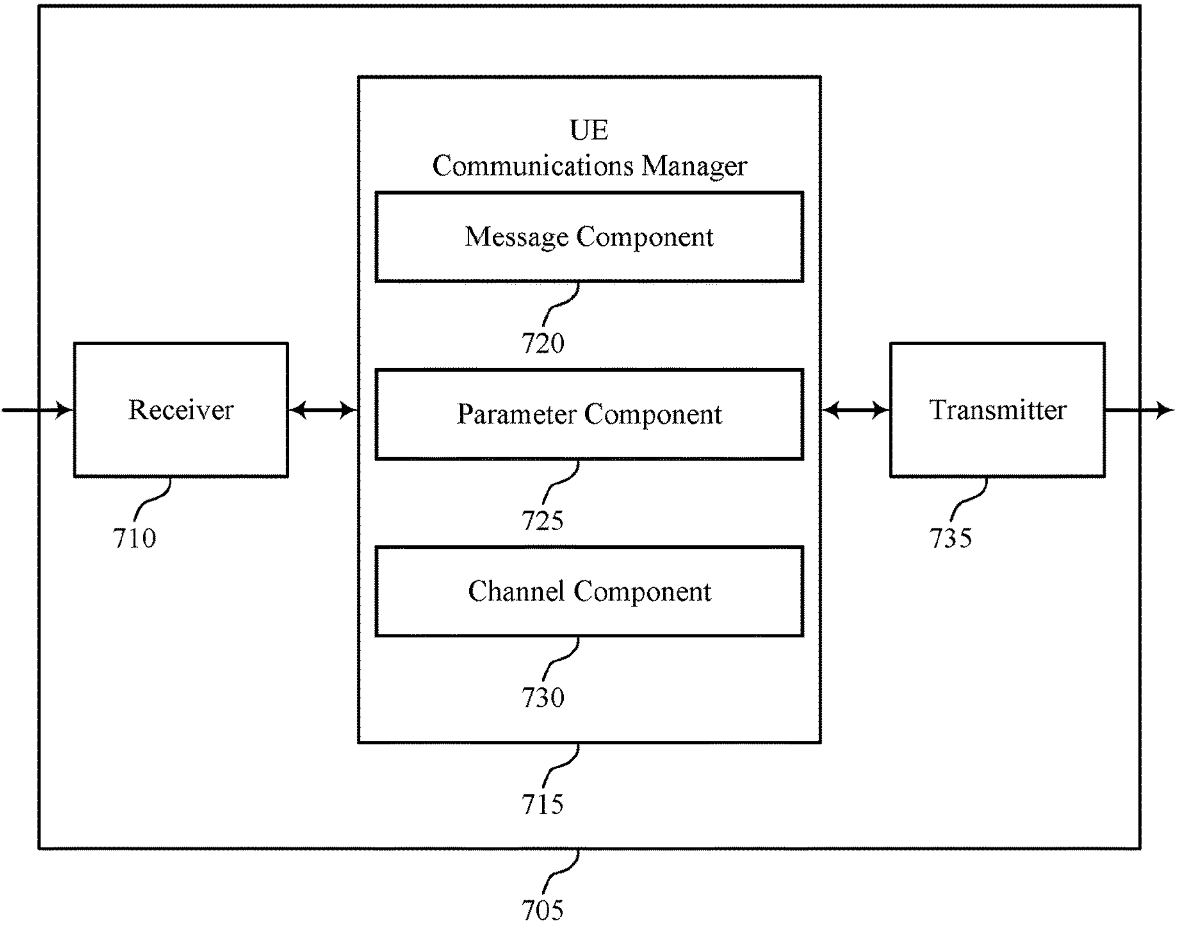

FIG. 7 shows a block diagram 700 of a device 705 that supports demodulation reference signaling for selective channels in accordance with aspects of the present disclosure. The device 705 may be an example of aspects of a device 605, or a UE 115 as described herein. The device 705 may include a receiver 710, a UE communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to demodulation reference signaling for selective channels, etc.). Information may be passed on to other components of the device 705. The receiver 710 may be an example of aspects of the transceiver 920 described with reference to FIG. 9. The receiver 710 may utilize a single antenna or a set of antennas.

The UE communications manager 715 may be an example of aspects of the UE communications manager 615 as described herein. The UE communications manager 715 may include a message component 720, a parameter component 725, and a channel component 730. The UE communications manager 715 may be an example of aspects of the UE communications manager 910 described herein. The message component 720 may receive a message including an indication of a set of DMRS candidates for a data channel. The parameter component 725 may determine a set of parameters associated with the set of DMRS candidates based on the received message, the set of parameters corresponding to a radio frequency spectrum subband or a radio frequency spectrum band associated with the data channel. The channel component 730 may estimate one or more characteristics of the data channel using the set of parameters associated with the set of DMRS candidates.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
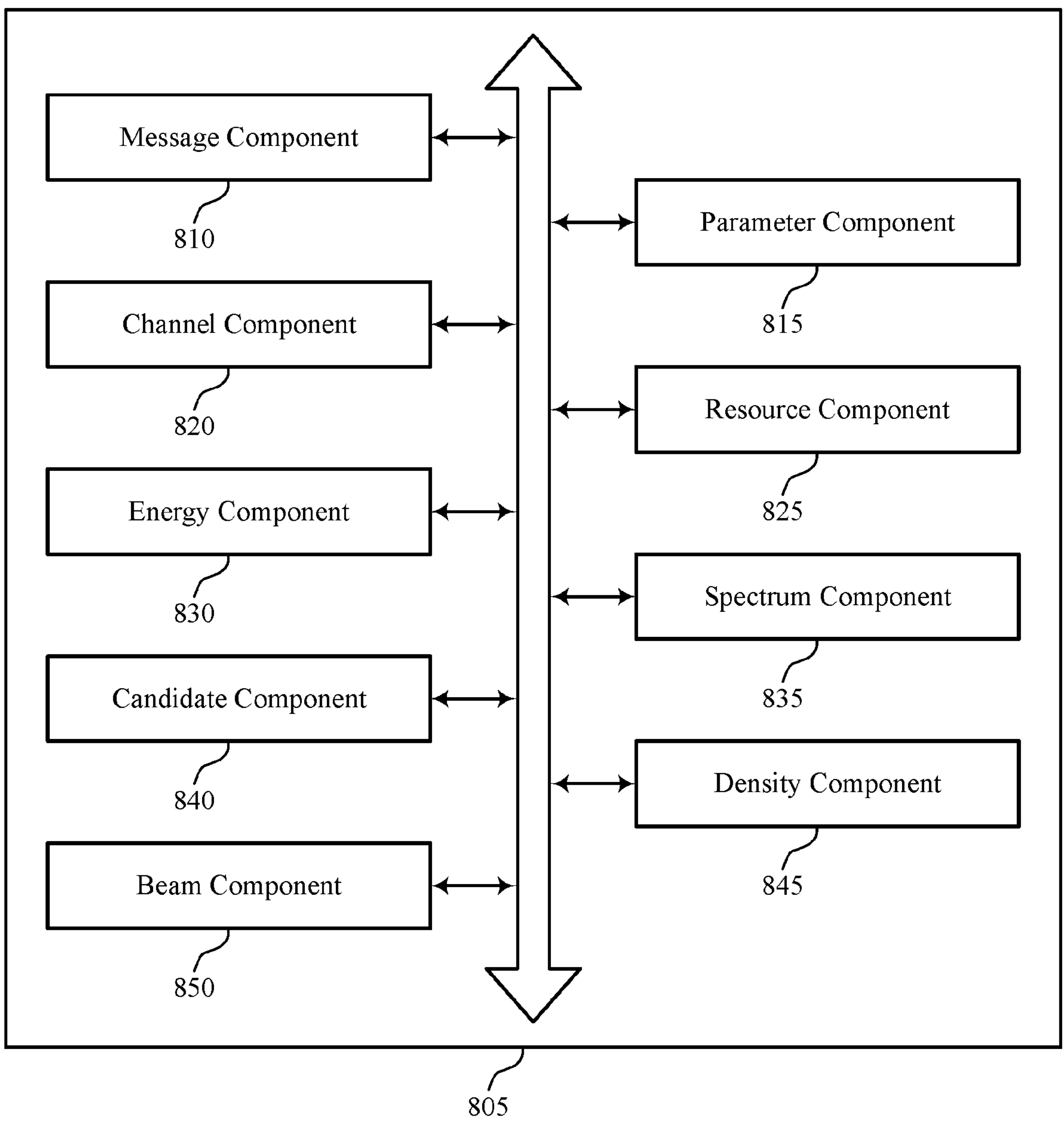
FIG. 8 shows a block diagram of a user equipment (UE) communications manager that supports demodulation reference signaling for selective channels in accordance with aspects of the present disclosure.

FIG. 8 shows a block diagram 800 of a UE communications manager 805 that supports demodulation reference signaling for selective channels in accordance with aspects of the present disclosure. The UE communications manager 805 may be an example of aspects of a UE communications manager 615, a UE communications manager 715, or a UE communications manager 910 described herein. The UE communications manager 805 may include a message component 810, a parameter component 815, a channel component 820, a resource component 825, an energy component 830, a spectrum component 835, a candidate component 840, a density component 845, and a beam component 850. Each of these modules may communicate, directly or indirectly, with one another (e.g., via one or more buses).

The message component 810 may receive a message including an indication of a set of DMRS candidates for a data channel. In some examples, the message component 810 may receive a radio resource control configuration message including the indication of the set of DMRS candidates for the data channel. In some examples, the message component 810 may receive a channel state information report including an indication of a size of the radio frequency spectrum subband. In some examples, identifying the size of the radio frequency spectrum subband based on the received channel state information report, where estimating the one or more characteristics of the data channel includes estimating the one or more characteristics of the data channel based on the size of the radio frequency spectrum subband. In some examples, the message component 810 may receive a DCI message.

In some examples, identifying at least one DMRS candidate of the set of DMRS candidates for the data channel based on the DCI message, where estimating the one or more characteristics of the data channel includes estimating the one or more characteristics of the data channel using the at least one DMRS candidate. In some examples, the message component 810 may receive a DCI message including a second indication of a differential step identifying a differential DMRS candidate index-step. In some examples, the message component 810 may select a DMRS candidate from the set of DMRS candidates by comparing the differential DMRS candidate index-step to an index of a default DMRS candidate, where estimating the one or more characteristics of the data channel includes estimating the one or more characteristics of the data channel using the selected DMRS candidate.

In some examples, the message component 810 may receive a second message including a second indication to activate one or more DMRS candidates of the set of DMRS candidates for the data channel. In some examples, receiving a third message including a third indication of at least one DMRS candidate of the activated one or more DMRS s, where estimating the one or more characteristics of the data channel includes. In some examples, the message component 810 may receive a second message including a second indication to deactivate the one or more DMRS candidates of the set of DMRS candidates. In some examples, the message component 810 may receive a third message including a third indication of at least one DMRS candidate of the set of DMRS candidates remaining activated. In some cases, the DCI message includes a GC-DCI message associated with a group of UEs. In some cases, the GC-DCI message includes a second indication of the at least one DMRS candidate of the set of DMRS candidates for the data channel. In some cases, the third message includes a UE-specific DCI message or a GC-DCI message, and the second message includes a medium access control-control element message.

The parameter component 815 may determine a set of parameters associated with the set of DMRS candidates based on the received message, the set of parameters corresponding to a radio frequency spectrum subband or a radio frequency spectrum band associated with the data channel. The channel component 820 may estimate one or more characteristics of the data channel using the set of parameters associated with the set of DMRS candidates. In some examples, the channel component 820 may estimate the one or more characteristics of the data channel based on blind selecting a DMRS candidate of the set of DMRS candidates. In some cases, the data channel includes a PDSCH. In some cases, the data channel includes a PUSCH.

The resource component 825 may determine a number of symbols associated with the set of DMRS candidates for the data channel based on the set of parameters associated with the set of DMRS candidates, where estimating the one or more characteristics of the data channel includes estimating the one or more characteristics of the data channel based on the number of symbols associated with the set of DMRS candidates for the data channel. In some examples, the resource component 825 may determine a location of at least one symbol of the number of symbols associated with the set of DMRS candidates for the data channel in a slot based on the set of parameters associated with the set of DMRS candidates, where estimating the one or more characteristics of the data channel includes estimating the one or more characteristics of the data channel based on the location of the at least one symbol of the number of symbols associated with the set of DMRS candidates for the data channel in the slot.

The resource component 825 may determine a number of resource elements associated with at least one symbol of the number of symbols associated with the set of DMRS candidates for the data channel based on the set of parameters associated with the set of DMRS candidates, where estimating the one or more characteristics of the data channel includes estimating the one or more characteristics of the data channel based on the number of resource elements associated with the at least one symbol of the number of symbols associated with the set of DMRS candidates for the data channel. In some examples, the resource component 825 may determine, based on the set of parameters associated with the set of DMRS candidates, that the number of resource elements associated with at least one symbol of the number of symbols associated with the set of DMRS candidates is reserved for the data channel. In some examples, the resource component 825 may determine a size of a physical resource block group associated with the set of DMRS candidates, where determining a size of the radio frequency spectrum subband includes determining the size of the radio frequency spectrum subband based on the size of the physical resource block group. In some examples, the resource component 825 may determine a size of a physical resource block bundle associated with the set of DMRS candidates, where determining a size of the radio frequency spectrum subband includes determining the size of the radio frequency spectrum subband based on the size of the physical resource block bundle.

In some examples, the resource component 825 may determine at least two adjacent symbols associated with the set of DMRS candidates for the data channel include a same quasi co-location type based on the set of parameters associated with the set of DMRS candidates, where estimating the one or more characteristics of the data channel includes estimating the one or more characteristics of the data channel based on the at least two adjacent symbols associated with the set of DMRS candidates for the data channel including a same quasi co-location type. In some examples, the resource component 825 may determine at least two adjacent symbols associated with the set of DMRS candidates for the data channel include different quasi co-location types based on the set of parameters associated with the set of DMRS candidates, where estimating the one or more characteristics of the data channel includes estimating the one or more characteristics of the data channel based on the at least two adjacent symbols associated with the set of DMRS candidates for the data channel including different quasi co-location types.

The energy component 830 may determine an energy per resource element ratio based on the set of parameters associated with the set of DMRS candidates, where estimating the one or more characteristics of the data channel includes estimating the one or more characteristics of the data channel based on the energy per resource element ratio associated with the set of DMRS candidates. In some examples, energy component 830 may determine the energy per resource element ratio between a first resource element associated with a DMRS candidate and a second resource element associated with the data channel, where estimating the one or more characteristics of the data channel includes estimating the one or more characteristics of the data channel based on the energy per resource element ratio between the first resource element associated with the DMRS candidate and the second resource element associated with the data channel.

The spectrum component 835 may determine a size of the radio frequency spectrum subband based on at least one parameter of the set of parameters, where estimating the one or more characteristics of the data channel includes estimating the one or more characteristics of the data channel based on the size of the radio frequency spectrum subband. In some examples, the spectrum component 835 determine a default size associated with the radio frequency spectrum subband based on at least one parameter of the set of parameters, where determining a size of the radio frequency spectrum subband includes assigning the default size to the radio frequency spectrum subband, where estimating the one or more characteristics of the data channel includes estimating the one or more characteristics of the data channel based on the default size of the radio frequency spectrum subband. In some cases, the size of the radio frequency spectrum subband is UE-specific.

The candidate component 840 may determine a default DMRS candidate of the set of DMRS candidates for the data channel based on the received message, where estimating the one or more characteristics of the data channel includes estimating the one or more characteristics of the data channel using the default DMRS candidate. In some examples, the candidate component 840 may determine an order of each DMRS candidate in the set of DMRS candidates for the data channel based on the received message, where estimating the one or more characteristics of the data channel includes estimating the one or more characteristics of the data channel based on the order of each DMRS candidate in the set of DMRS candidates.

The density component 845 may determine a density of the set of DMRS candidates or an energy per resource element ratio of each DMRS candidate of the set of DMRS candidates. In some examples, the density component 845 may order each DMRS candidate in the set of DMRS candidates based on the density of the set of DMRS candidates or the energy per resource element ratio of each DMRS candidate of the set of DMRS candidates, where estimating the one or more characteristics of the data channel includes. In some examples, the density component 845 may estimate the one or more characteristics of the data channel based on the ordering.

The density component 845 may identify a DMRS candidate having a highest DMRS density in the set of DMRS candidates. In some examples, the density component 845 may determine a default transport block size associated with the data channel based on the identified DMRS candidate having the highest DMRS density, where estimating the one or more characteristics of the data channel includes estimating the one or more characteristics of the data channel based on the default transport block size associated with the data channel. The density component 845 may identify a DMRS candidate having a lowest DMRS density in the set of DMRS candidates. In some examples, the density component 845 may determine a default transport block size associated with the data channel based on the identified DMRS candidate having the lowest DMRS density, where estimating the one or more characteristics of the data channel includes estimating the one or more characteristics of the data channel based on the default transport block size associated with the data channel.

The beam component 850 may identify a quasi co-location state or a TCI state based on the received message. The beam component 850 may determine a DMRS candidate of the set of DMRS candidates based on the quasi co-location state or the TCI state, where estimating the one or more characteristics of the data channel includes estimating the one or more characteristics of the data channel using the determined DMRS candidate.

Figure 9:
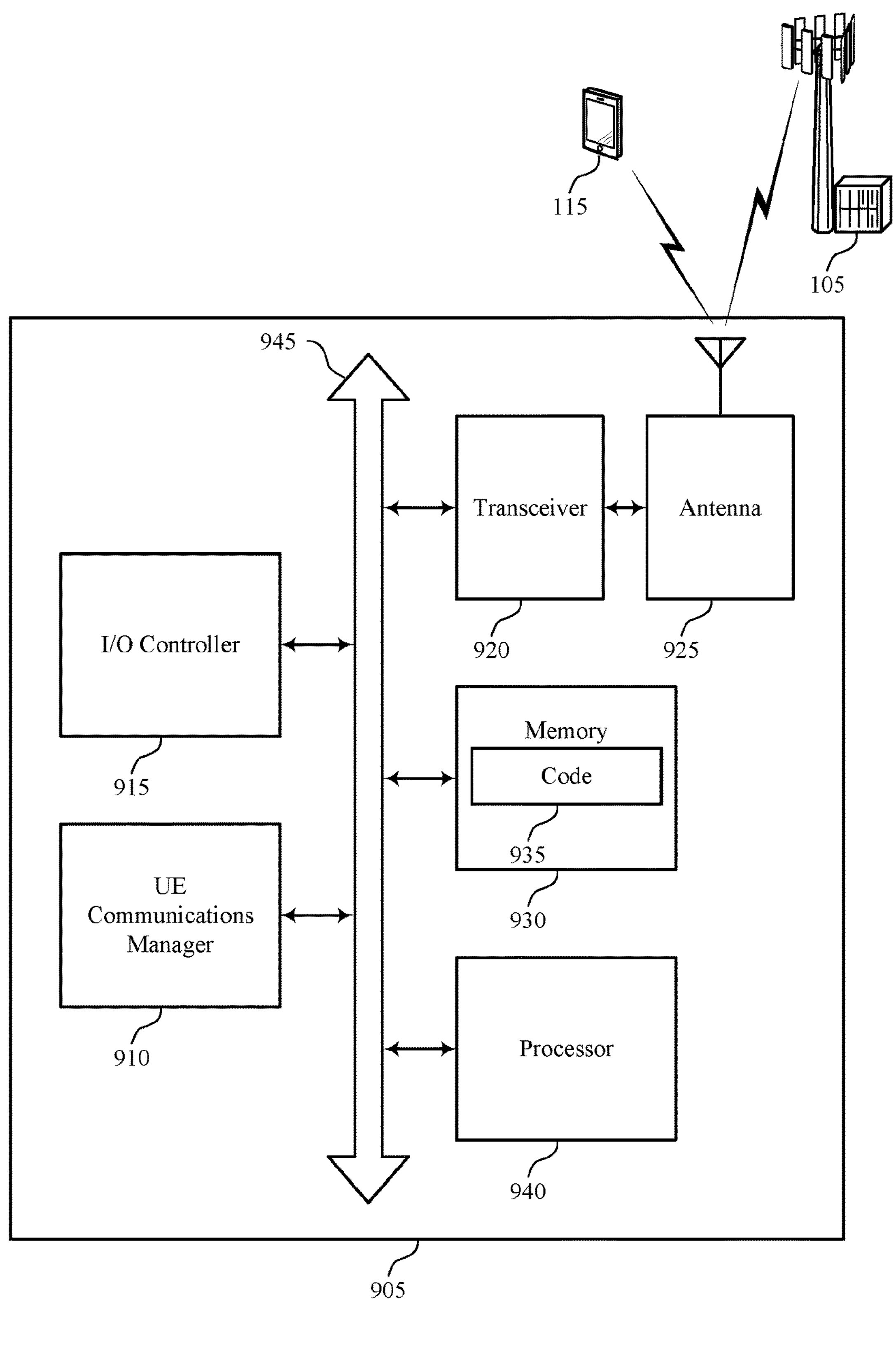
FIG. 9 shows a diagram of a system including a device that supports demodulation reference signaling for selective channels in accordance with aspects of the present disclosure.

FIG. 9 shows a diagram of a system 900 including a device 905 that supports demodulation reference signaling for selective channels in accordance with aspects of the present disclosure. The device 905 may be an example of or include the components of device 605, device 705, or a UE 115 as described herein. The device 905 may include components for bi-directional voice and data communications including components for transmitting and receiving communications, including a UE communications manager 910, an I/O controller 915, a transceiver 920, an antenna 925, memory 930, and a processor 940. These components may be in electronic communication via one or more buses (e.g., bus 945).

The UE communications manager 910 may receive a message including an indication of a set of DMRS candidates for a data channel. The UE communications manager 910 may determine a set of parameters associated with the set of DMRS candidates based on the received message. The set of parameters corresponding to a radio frequency spectrum subband or a radio frequency spectrum band associated with the data channel. The UE communications manager 910 may estimate one or more characteristics of the data channel using the set of parameters associated with the set of DMRS candidates.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as ioS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor 940 to perform various functions described herein. In some cases, the memory 930 may contain, among other things, a BIOS which may control basic hardware or software operation such as the interaction with peripheral components or devices. The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting demodulation reference signaling for selective channels).

Figure 10:
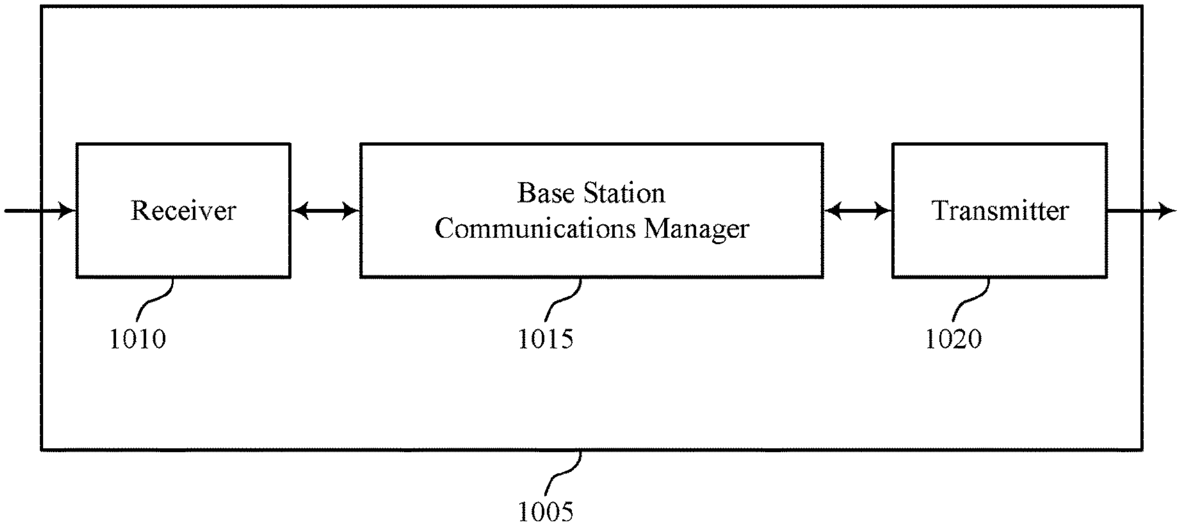
FIGS. 10 and 11 show block diagrams of devices that support demodulation reference signaling for selective channels in accordance with aspects of the present disclosure.

FIG. 10 shows a block diagram 1000 of a device 1005 that supports demodulation reference signaling for selective channels in accordance with aspects of the present disclosure. The device 1005 may be an example of aspects of a base station 105 as described herein. The device 1005 may include a receiver 1010, a base station communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to demodulation reference signaling for selective channels, etc.). Information may be passed on to other components of the device 1005. The receiver 1010 may be an example of aspects of the transceiver 1320 described with reference to FIG. 13. The receiver 1010 may utilize a single antenna or a set of antennas.

The base station communications manager 1015 may determine a set of parameters associated with a set of DMRS candidates. The set of parameters corresponding to a radio frequency spectrum subband or a radio frequency spectrum band associated with a data channel. The base station communications manager 1015 transmit a message including an indication of the set of DMRS candidates and the associated set of parameters for the data channel, and estimate one or more characteristics of the data channel using the set of parameters associated with the set of DMRS candidates. The base station communications manager 1015 may be an example of aspects of the base station communications manager 1310 described herein.

The base station communications manager 1015, or its sub-components, may be implemented in hardware, code (e.g., software or firmware) executed by a processor, or any combination thereof. If implemented in code executed by a processor, the functions of the base station communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station communications manager 1015, or its sub-components, may be physically located at various positions, including being distributed such that portions of functions are implemented at different physical locations by one or more physical components. In some examples, the base station communications manager 1015, or its sub-components, may be a separate and distinct component in accordance with various aspects of the present disclosure. In some examples, the base station communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
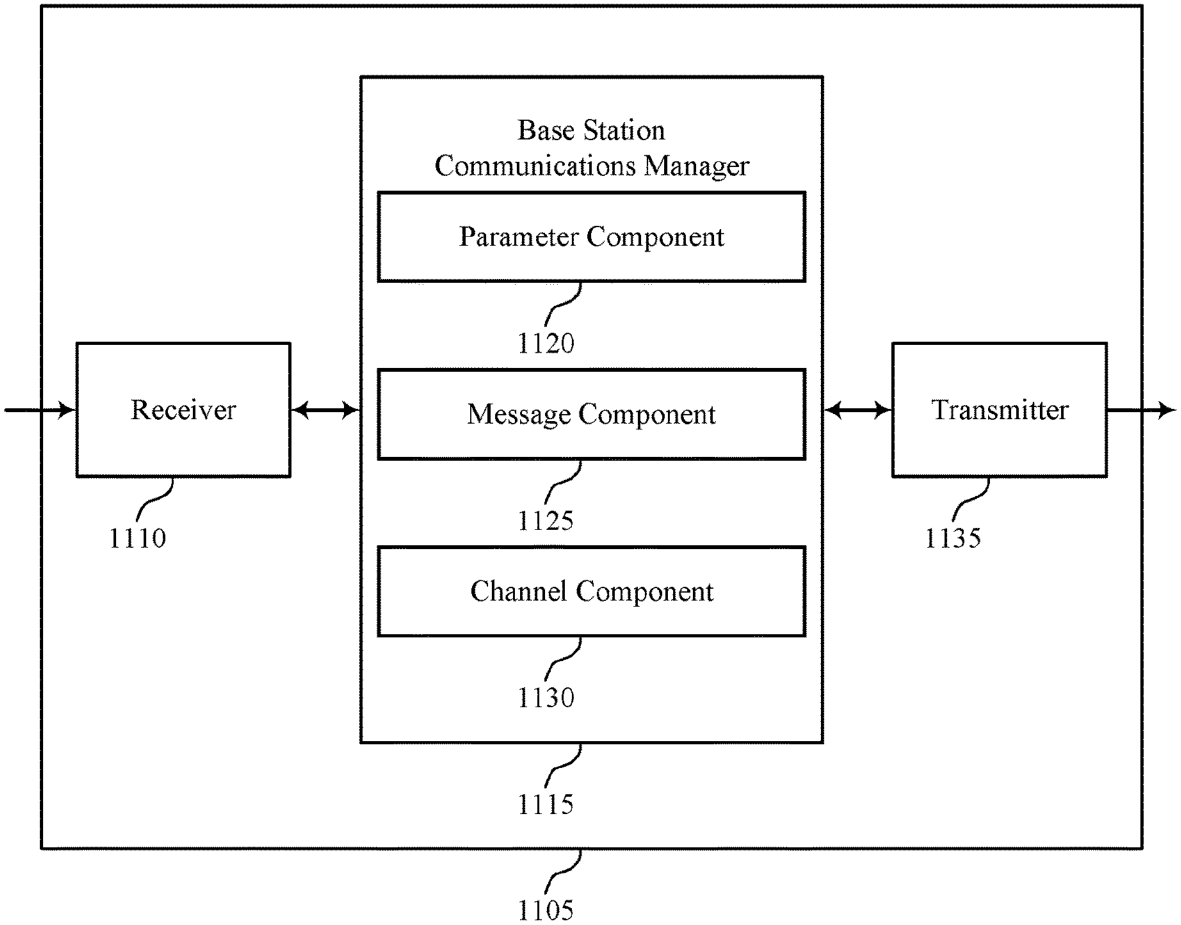

FIG. 11 shows a block diagram 1100 of a device 1105 that supports demodulation reference signaling for selective channels in accordance with aspects of the present disclosure. The device 1105 may be an example of aspects of a device 1005, or a base station 105 as described herein. The device 1105 may include a receiver 1110, a base station communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to demodulation reference signaling for selective channels, etc.). Information may be passed on to other components of the device 1105. The receiver 1110 may be an example of aspects of the transceiver 1320 described with reference to FIG. 13. The receiver 1110 may utilize a single antenna or a set of antennas.

The base station communications manager 1115 may be an example of aspects of the base station communications manager 1015 as described herein. The base station communications manager 1115 may include a parameter component 1120, a message component 1125, and a channel component 1130. The base station communications manager 1115 may be an example of aspects of the base station communications manager 1310 described herein. The parameter component 1120 may determine a set of parameters associated with a set of DMRS candidates, the set of parameters corresponding to a radio frequency spectrum subband or a radio frequency spectrum band associated with a data channel. The message component 1125 may transmit a message including an indication of the set of DMRS candidates and the associated set of parameters for the data channel. The channel component 1130 may estimate one or more characteristics of the data channel using the set of parameters associated with the set of DMRS candidates.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
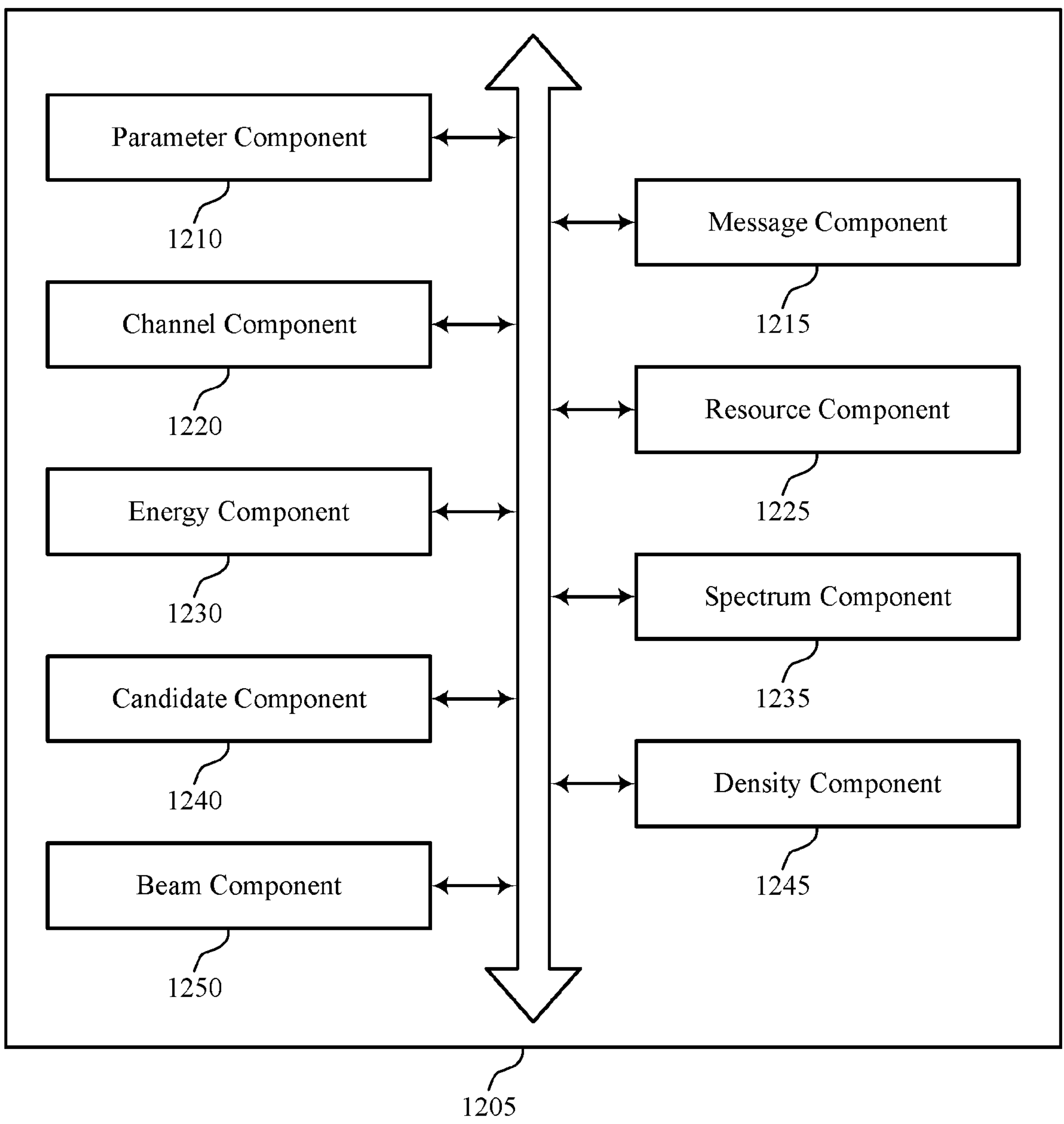
FIG. 12 shows a block diagram of a base station communications manager that supports demodulation reference signaling for selective channels in accordance with aspects of the present disclosure.

FIG. 12 shows a block diagram 1200 of a base station communications manager 1205 that supports demodulation reference signaling for selective channels in accordance with aspects of the present disclosure. The base station communications manager 1205 may be an example of aspects of a base station communications manager 1015, a base station communications manager 1115, or a base station communications manager 1310 described herein. The base station communications manager 1205 may include a parameter component 1210, a message component 1215, a channel component 1220, a resource component 1225, an energy component 1230, a spectrum component 1235, a candidate component 1240, a density component 1245, and a beam component 1250. Each of these modules may communicate, directly or indirectly, with one another (e.g., via one or more buses).

The parameter component 1210 may determine a set of parameters associated with a set of DMRS candidates, the set of parameters corresponding to a radio frequency spectrum subband or a radio frequency spectrum band associated with a data channel. The message component 1215 may transmit a message including an indication of the set of DMRS candidates and the associated set of parameters for the data channel. In some examples, the message component 1215 may transmit an RRC configuration message including the indication of the set of DMRS candidates for the data channel. The message component 1215 may transmit a CSI report including an indication of a size of the radio frequency spectrum subband, where estimating the one or more characteristics of the data channel includes estimating the one or more characteristics of the data channel based on the size of the radio frequency spectrum subband.

The message component 1215 may transmit a DCI message including a second indication of a differential step identifying a differential DMRS candidate index-step. In some examples, the message component 1215 may select a DMRS candidate from the set of DMRS candidates by comparing the differential DMRS candidate index-step to an index of a default DMRS candidate, where estimating the one or more characteristics of the data channel includes estimating the one or more characteristics of the data channel using the selected DMRS candidate. In some examples, the message component 1215 may transmit a second message including a second indication to activate one or more DMRS candidates of the set of DMRS candidates for the data channel. In some examples, the message component 1215 may transmit a third message including a third indication of at least one DMRS candidate of the activated one or more DMRS, where estimating the one or more characteristics of the data channel includes estimating the one or more characteristics of the data channel using the at least one DMRS candidate.

The message component 1215 may transmit a second message including a second indication to deactivate the one or more DMRS candidates of the set of DMRS candidates. In some examples, the message component 1215 may transmit a third message including a third indication of at least one DMRS candidate of the set of DMRS candidates remaining activated, where estimating the one or more characteristics of the data channel includes estimating the one or more characteristics of the data channel based on deactivating the one or more DMRS candidates of the set of DMRS candidates. The DCI message includes a GC-DCI message associated with a group of UEs. In some cases, the third message includes a UE-specific DCI message or a GC-DCI message, and the second message includes a MAC-CE message.

The channel component 1220 may estimate one or more characteristics of the data channel using the set of parameters associated with the set of DMRS candidates. In some examples, the channel component 1220 may estimate the one or more characteristics of the data channel using the at least one DMRS candidate. In some examples, the channel component 1220 may estimate the one or more characteristics of the data channel based on blind selecting a DMRS candidate of the set of DMRS candidates. In some cases, the DCI message includes a GC-DCI message associated with a group of UEs. In some cases, the GC-DCI message includes a second indication of the at least one DMRS candidate of the set of DMRS candidates for the data channel. In some cases, the data channel includes a PUSCH. In some cases, the data channel includes a PDSCH.

The resource component 1225 may allocate a number of symbols associated with the set of DMRS candidates for the data channel based on the set of parameters associated with the set of DMRS candidates, where estimating the one or more characteristics of the data channel includes estimating the one or more characteristics of the data channel based on the number of symbols associated with the set of DMRS candidates for the data channel. In some examples, allocating a location of at least one symbol of the number of symbols associated with the set of DMRS candidates for the data channel in a slot based on the set of parameters associated with the set of DMRS candidates, where estimating the one or more characteristics of the data channel includes estimating the one or more characteristics of the data channel based on the location of the at least one symbol of the number of symbols associated with the set of DMRS candidates for the data channel in the slot. In some examples, allocating a number of resource elements associated with at least one symbol of the number of symbols associated with the set of DMRS candidates for the data channel based on the set of parameters associated with the set of DMRS candidates, where estimating the one or more characteristics of the data channel includes estimating the one or more characteristics of the data channel based on the number of resource elements associated with the at least one symbol of the number of symbols associated with the set of DMRS candidates for the data channel.

In some examples, the resource component 1225 may reserve the number of resource elements associated with at least one symbol of the number of symbols associated with the set of DMRS candidates for the data channel based on the set of parameters associated with the set of DMRS candidates. In some examples, the resource component 1225 may determine at least two adjacent symbols associated with the set of DMRS candidates for the data channel include a same quasi co-location type based on the set of parameters associated with the set of DMRS candidates, where estimating the one or more characteristics of the data channel includes estimating the one or more characteristics of the data channel based on the at least two adjacent symbols associated with the set of DMRS candidates for the data channel including a same quasi co-location type. In some examples, the resource component 1225 may estimate the one or more characteristics of the data channel based on the at least two adjacent symbols associated with the set of DMRS candidates for the data channel including different quasi co-location types.

The energy component 1230 may allocate an energy per resource element ratio associated with at least one symbol associated with the set of DMRS candidates based on the set of parameters associated with the set of DMRS candidates, where estimating the one or more characteristics of the data channel includes estimating the one or more characteristics of the data channel based on the energy per resource element ratio associated with at least one symbol associated with the set of DMRS candidates. The energy component 1230 may allocate the energy per resource element ratio between a first resource element associated with the set of DMRS candidates and a second resource element associated with the data channel, where estimating the one or more characteristics of the data channel includes estimating the one or more characteristics of the data channel based on the energy per resource element ratio between the first resource element associated with the set of DMRS candidates and the second resource element associated with the data channel.

The spectrum component 1235 may allocate a size of the radio frequency spectrum subband, where estimating the one or more characteristics of the data channel includes estimating the one or more characteristics of the data channel based on the size of the radio frequency spectrum subband. In some examples, the spectrum component 1235 may allocate a default size associated with the radio frequency spectrum subband based on a subband related parameter, where allocating a size of the radio frequency spectrum subband includes assigning the default size to the radio frequency spectrum subband, where estimating the one or more characteristics of the data channel includes estimating the one or more characteristics of the data channel based on the default size of the radio frequency spectrum subband. In some examples, the spectrum component 1235 may allocate the size of the radio frequency spectrum subband based on the size of the physical resource block group. In some examples, the spectrum component 1235 may allocate the size of the radio frequency spectrum subband based on the size of the physical resource block bundle. In some cases, the size of the radio frequency subband is UE-specific.

The candidate component 1240 may allocate a default DMRS candidate of the set of DMRS candidates for the data channel based on the set of parameters associated with the set of DMRS candidates, where estimating the one or more characteristics of the data channel includes estimating the one or more characteristics of the data channel using the default DMRS candidate. In some examples, the candidate component 1240 may allocate an order of each DMRS candidate in the set of DMRS candidates for the data channel based on the set of parameters associated with the set of DMRS candidates, where estimating the one or more characteristics of the data channel includes estimating the one or more characteristics of the data channel based on the order of each DMRS candidate in the set of DMRS candidates.

The density component 1245 may allocate a density of the set of DMRS candidates or an energy per resource element ratio of each DMRS candidate of the set of DMRS candidates. In some examples, the density component 1245 may order each DMRS candidate in the set of DMRS candidates based on the density of the set of DMRS candidates or the energy per resource element ratio of each DMRS candidate of the set of DMRS candidates, where estimating the one or more characteristics of the data channel includes estimating the one or more characteristics of the data channel based on the ordering.

In some examples, the density component 1245 may identify a DMRS candidate having a highest DMRS density in the set of DMRS candidates. In some examples, the density component 1245 may determine a default transport block size associated with the data channel based on identified DMRS candidate having the highest DMRS density. In some examples, the density component 1245 may determine a default transport block size associated with the data channel based on identified DMRS candidate having the highest DMRS density, where estimating the one or more characteristics of the data channel includes estimating the one or more characteristics of the data channel based on the default transport block size associated with the data channel. In some examples, the density component 1245 may identify a DMRS candidate having a lowest DMRS density in the set of DMRS candidates. In some examples, the density component 1245 may determine a default transport block size associated with the data channel based on identified DMRS candidate having the lowest DMRS density, where estimating the one or more characteristics of the data channel includes estimating the one or more characteristics of the data channel based on the default transport block size associated with the data channel.

The beam component 1250 may identify a quasi co-location state or a TCI state based on the received message. In some examples, the beam component 1250 may determine a DMRS candidate of the set of DMRS candidates based on the quasi co-location state or the TCI state, where estimating the one or more characteristics of the data channel includes estimating the one or more characteristics of the data channel using the determined DMRS candidate.

Figure 13:
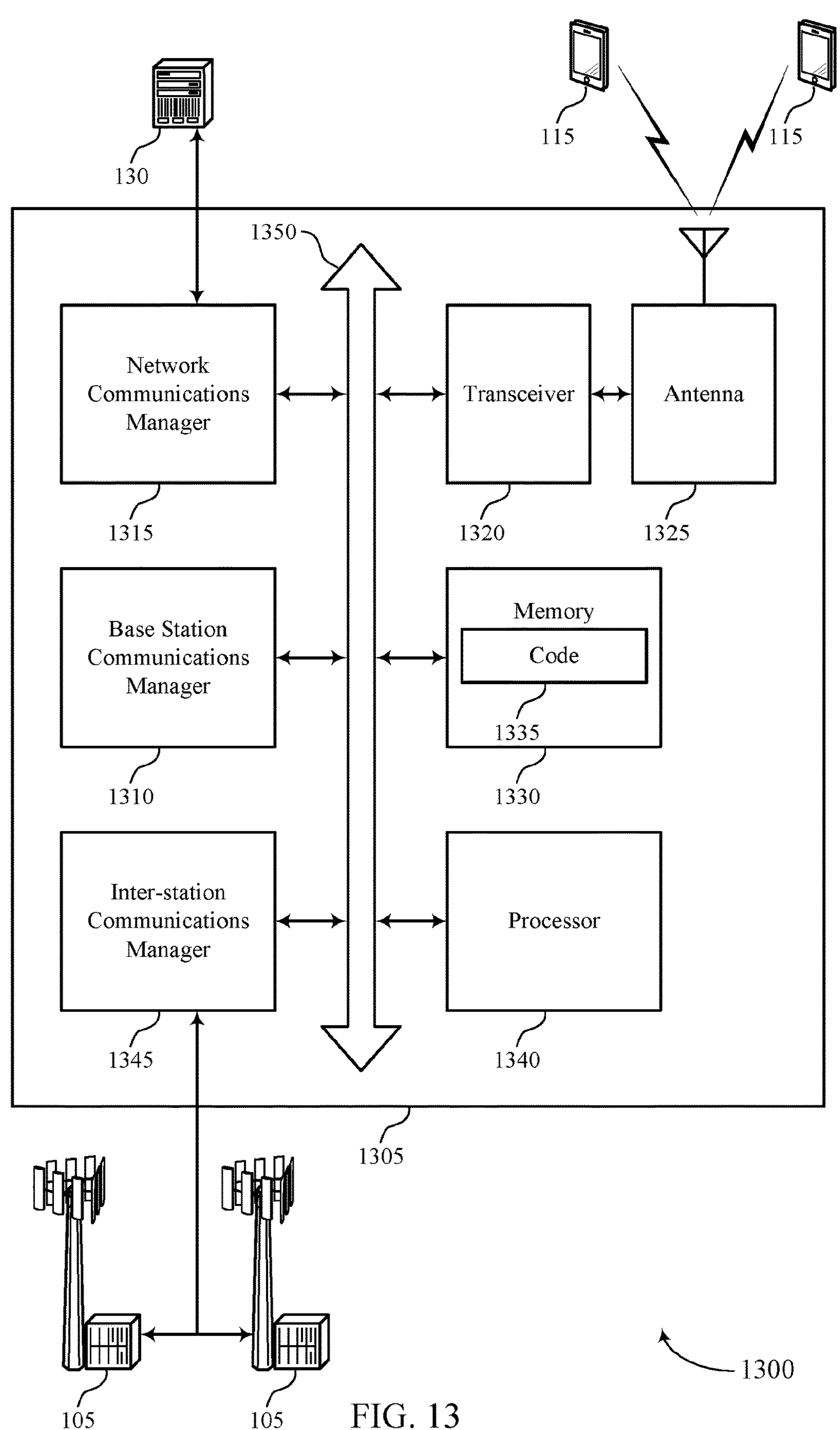
FIG. 13 shows a diagram of a system including a device that supports demodulation reference signaling for selective channels in accordance with aspects of the present disclosure.

FIG. 13 shows a diagram of a system 1300 including a device 1305 that supports demodulation reference signaling for selective channels in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a base station communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The base station communications manager 1310 may determine a set of parameters associated with a set of DMRS candidates. The set of parameters may correspond to a radio frequency spectrum subband or a radio frequency spectrum band associated with a data channel (e.g., a PDSCH, a PUSCH). The base station communications manager 1310 may transmit a message including an indication of the set of DMRS candidates and the associated set of parameters for the data channel. The base station communications manager 1310 may estimate one or more characteristics of the data channel using the set of parameters associated with the set of DMRS candidates. The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas. In some cases, the device 1305 may include a single antenna 1325. However, in some cases, the device 1305 may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices. The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting demodulation reference signaling for selective channels).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

Figure 14:
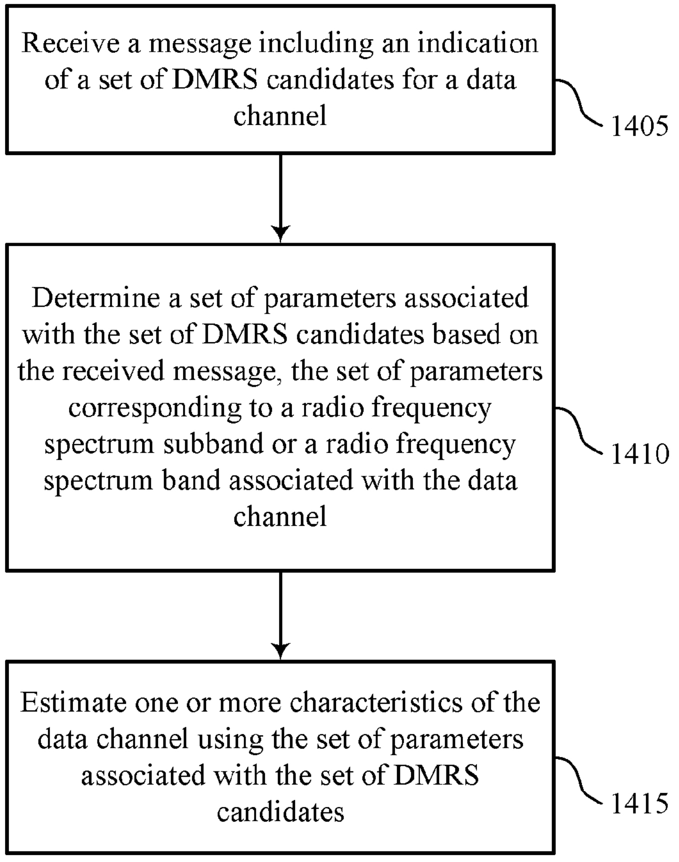
FIGS. 14 through 17 show flowcharts illustrating methods that support demodulation reference signaling for selective channels in accordance with aspects of the present disclosure.

FIG. 14 shows a flowchart illustrating a method 1400 that supports demodulation reference signaling for selective channels in accordance with aspects of the present disclosure. The operations of method 1400 may be implemented by a UE 115 or its components as described herein. For example, the operations of method 1400 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive a message including an indication of a set of DMRS candidates for a data channel. The operations of 1405 may be performed according to the methods described herein. In some examples, aspects of the operations of 1405 may be performed by a message component as described with reference to FIGS. 6 through 9.

At 1410, the UE may determine a set of parameters associated with the set of DMRS candidates based on the received message, the set of parameters corresponding to a radio frequency spectrum subband or a radio frequency spectrum band associated with the data channel. The operations of 1410 may be performed according to the methods described herein. In some examples, aspects of the operations of 1410 may be performed by a parameter component as described with reference to FIGS. 6 through 9.

At 1415, the UE may estimate one or more characteristics of the data channel using the set of parameters associated with the set of DMRS candidates. The operations of 1415 may be performed according to the methods described herein. In some examples, aspects of the operations of 1415 may be performed by a channel component as described with reference to FIGS. 6 through 9.

Figure 15:
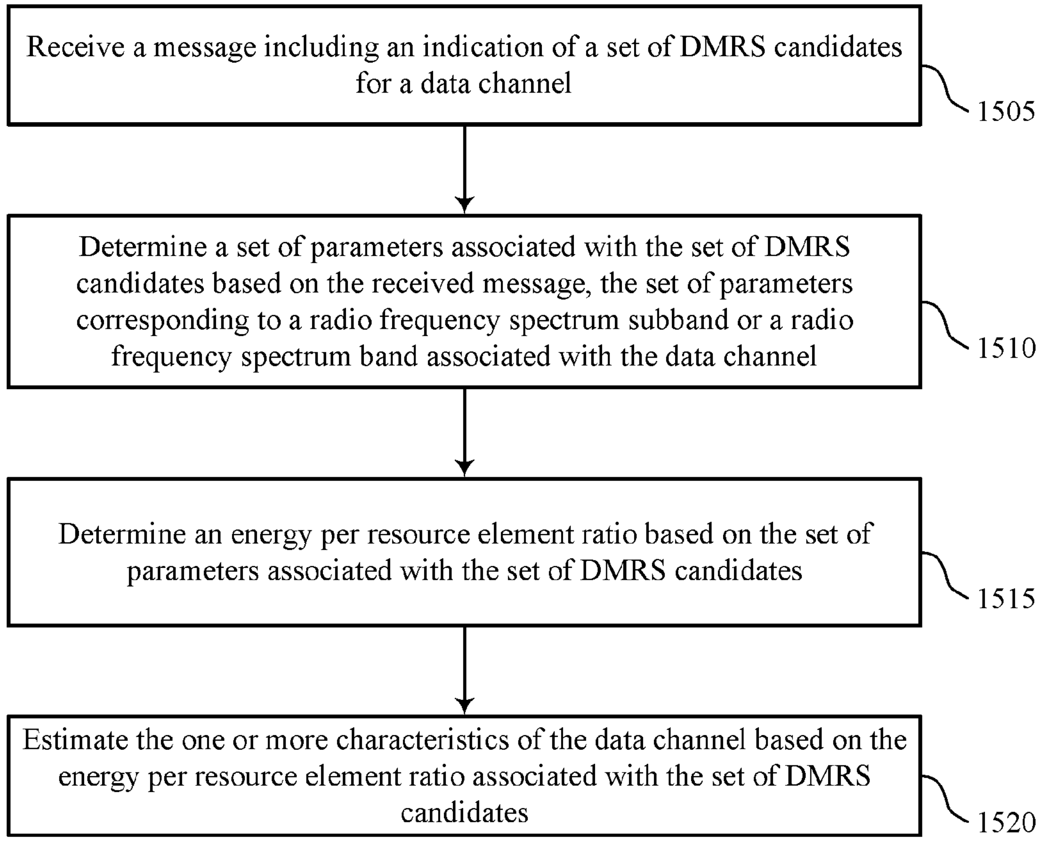

FIG. 15 shows a flowchart illustrating a method 1500 that supports demodulation reference signaling for selective channels in accordance with aspects of the present disclosure. The operations of method 1500 may be implemented by a UE 115 or its components as described herein. For example, the operations of method 1500 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive a message including an indication of a set of DMRS candidates for a data channel. The operations of 1505 may be performed according to the methods described herein. In some examples, aspects of the operations of 1505 may be performed by a message component as described with reference to FIGS. 6 through 9.

At 1510, the UE may determine a set of parameters associated with the set of DMRS candidates based on the received message, the set of parameters corresponding to a radio frequency spectrum subband or a radio frequency spectrum band associated with the data channel. The operations of 1510 may be performed according to the methods described herein. In some examples, aspects of the operations of 1510 may be performed by a parameter component as described with reference to FIGS. 6 through 9.

At 1515, the UE may determine an energy per resource element ratio based on the set of parameters associated with the set of DMRS candidates. The operations of 1515 may be performed according to the methods described herein. In some examples, aspects of the operations of 1515 may be performed by an energy component as described with reference to FIGS. 6 through 9.

At 1520, the UE may estimate the one or more characteristics of the data channel based on the energy per resource element ratio associated with the set of DMRS candidates. The operations of 1520 may be performed according to the methods described herein. In some examples, aspects of the operations of 1520 may be performed by an energy component as described with reference to FIGS. 6 through 9.

Figure 16:
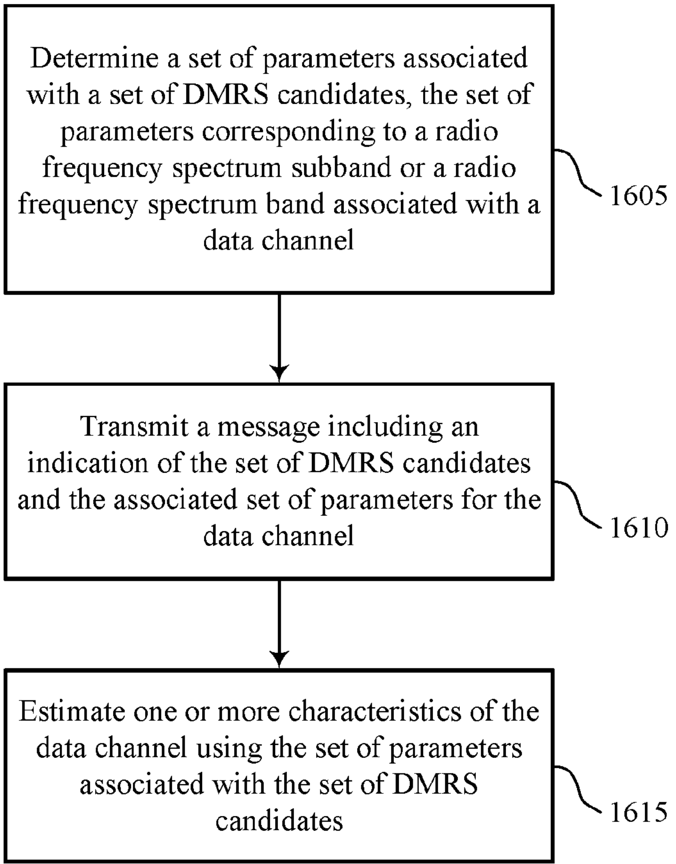

FIG. 16 shows a flowchart illustrating a method 1600 that supports demodulation reference signaling for selective channels in accordance with aspects of the present disclosure. The operations of method 1600 may be implemented by a base station 105 or its components as described herein. For example, the operations of method 1600 may be performed by a base station communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1605, the base station may determine a set of parameters associated with a set of DMRS candidates, the set of parameters corresponding to a radio frequency spectrum subband or a radio frequency spectrum band associated with a data channel. The operations of 1605 may be performed according to the methods described herein. In some examples, aspects of the operations of 1605 may be performed by a parameter component as described with reference to FIGS. 10 through 13.

At 1610, the base station may transmit a message including an indication of the set of DMRS candidates and the associated set of parameters for the data channel. The operations of 1610 may be performed according to the methods described herein. In some examples, aspects of the operations of 1610 may be performed by a message component as described with reference to FIGS. 10 through 13.

At 1615, the base station may estimate one or more characteristics of the data channel using the set of parameters associated with the set of DMRS candidates. The operations of 1615 may be performed according to the methods described herein. In some examples, aspects of the operations of 1615 may be performed by a channel component as described with reference to FIGS. 10 through 13.

Figure 17:
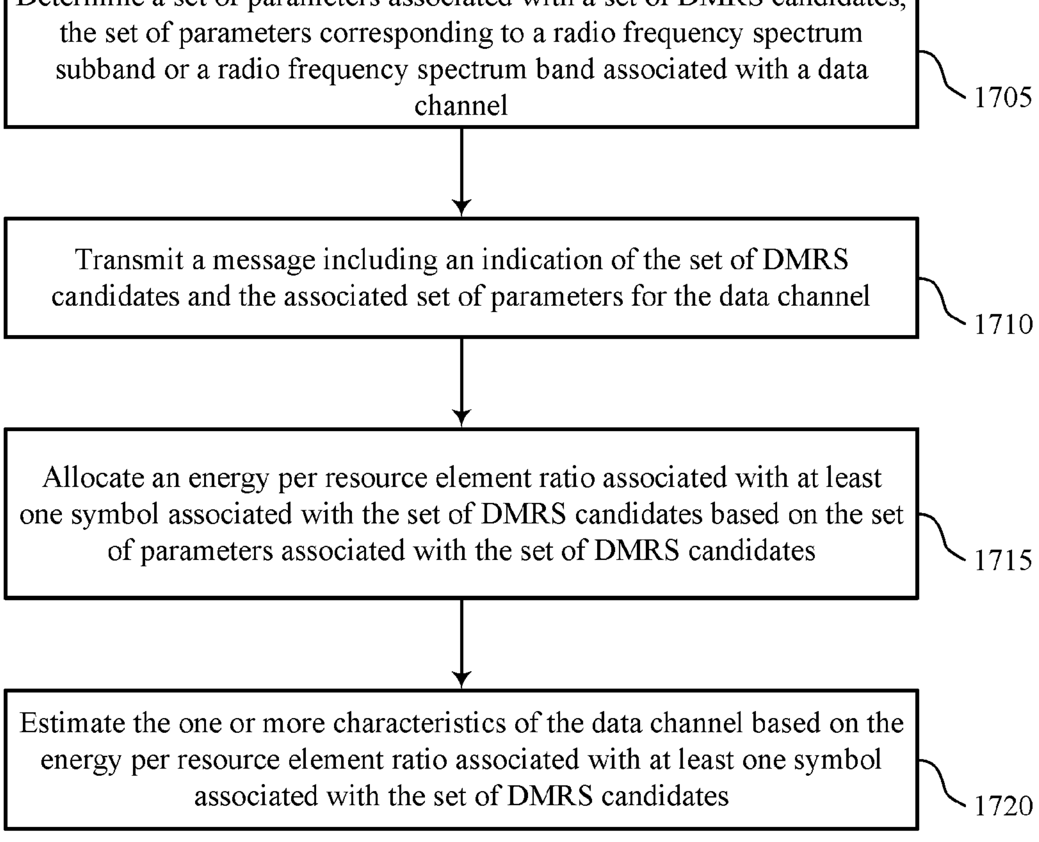

FIG. 17 shows a flowchart illustrating a method 1700 that supports demodulation reference signaling for selective channels in accordance with aspects of the present disclosure. The operations of method 1700 may be implemented by a base station 105 or its components as described herein. For example, the operations of method 1700 may be performed by a base station communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may determine a set of parameters associated with a set of DMRS candidates, the set of parameters corresponding to a radio frequency spectrum subband or a radio frequency spectrum band associated with a data channel. The operations of 1705 may be performed according to the methods described herein. In some examples, aspects of the operations of 1705 may be performed by a parameter component as described with reference to FIGS. 10 through 13.

At 1710, the base station may transmit a message including an indication of the set of DMRS candidates and the associated set of parameters for the data channel. The operations of 1710 may be performed according to the methods described herein. In some examples, aspects of the operations of 1710 may be performed by a message component as described with reference to FIGS. 10 through 13.

At 1715, the base station may allocate an energy per resource element ratio associated with at least one symbol associated with the set of DMRS candidates based on the set of parameters associated with the set of DMRS candidates. The operations of 1715 may be performed according to the methods described herein. In some examples, aspects of the operations of 1715 may be performed by an energy component as described with reference to FIGS. 10 through 13.

At 1720, the base station may estimate the one or more characteristics of the data channel based on the energy per resource element ratio associated with at least one symbol associated with the set of DMRS candidates. The operations of 1720 may be performed according to the methods described herein. In some examples, aspects of the operations of 1720 may be performed by an energy component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:

receiving a message comprising an indication of a set of demodulation reference signal candidates for a data channel;

determining a set of parameters associated with the set of demodulation reference signal candidates based at least in part on the received message, the set of parameters corresponding to a radio frequency spectrum subband or a radio frequency spectrum band associated with the data channel; and estimating one or more characteristics of the data channel using the set of parameters associated with the set of demodulation reference signal candidates, wherein the method further comprises a first procedure, a second procedure, a third procedure, a fourth procedure, or a fifth procedure, wherein the first procedure comprises:

determining a number of symbols associated with the set of demodulation reference signal candidates for the data channel based at least in part on the set of parameters associated with the set of demodulation reference signal candidates, wherein estimating the one or more characteristics of the data channel comprises: estimating the one or more characteristics of the data channel based at least in part on the number of symbols associated with the set of demodulation reference signal candidates for the data channel;

wherein the second procedure comprises:

determining an energy per resource element ratio based at least in part on the set of parameters associated with the set of demodulation reference signal candidates, wherein estimating the one or more characteristics of the data channel comprises: estimating the one or more characteristics of the data channel based at least in part on the energy per resource element ratio associated with the set of demodulation reference signal candidates;

wherein the third procedure comprises:

determining a size of the radio frequency spectrum subband based at least in part on at least one parameter of the set of parameters, wherein estimating the one or more characteristics of the data channel comprises: estimating the one or more characteristics of the data channel based at least in part on the size of the radio frequency spectrum subband;

wherein the fourth procedure comprises:

determining a default size associated with the radio frequency spectrum subband based at least in part on at least one parameter of the set of parameters, wherein determining a size of the radio frequency spectrum subband comprises: assigning the default size to the radio frequency spectrum subband, wherein estimating the one or more characteristics of the data channel comprises: estimating the one or more characteristics of the data channel based at least in part on the default size of the radio frequency spectrum subband; and wherein the fifth procedure comprises:

determining a size of a physical resource block group associated with the set of demodulation reference signal candidates, wherein determining a size of the radio frequency spectrum subband comprises: determining the size of the radio frequency spectrum subband based at least in part on the size of the physical resource block group.

2. The method of claim 1, further comprising the first procedure.

3. The method of claim 2, further comprising:

determining a location of at least one symbol of the number of symbols associated with the set of demodulation reference signal candidates for the data channel in a slot based at least in part on the set of parameters associated with the set of demodulation reference signal candidates, wherein estimating the one or more characteristics of the data channel comprises:

estimating the one or more characteristics of the data channel based at least in part on the location of the at least one symbol of the number of symbols associated with the set of demodulation reference signal candidates for the data channel in the slot.

4. The method of claim 2, further comprising:

determining a number of resource elements associated with at least one symbol of the number of symbols associated with the set of demodulation reference signal candidates for the data channel based at least in part on the set of parameters associated with the set of demodulation reference signal candidates, wherein estimating the one or more characteristics of the data channel comprises:

estimating the one or more characteristics of the data channel based at least in part on the number of resource elements associated with the at least one symbol of the number of symbols associated with the set of demodulation reference signal candidates for the data channel.

5. The method of claim 4, further comprising:

determining, based at least in part on the set of parameters associated with the set of demodulation reference signal candidates, that the number of resource elements associated with at least one symbol of the number of symbols associated with the set of demodulation reference signal candidates is reserved for the data channel.

6. The method of claim 1, further comprising the second procedure.

7. The method of claim 6, wherein determining the energy per resource element ratio comprises:

determining the energy per resource element ratio between a first resource element associated with a demodulation reference signal candidate and a second resource element associated with the data channel, wherein estimating the one or more characteristics of the data channel comprises:

estimating the one or more characteristics of the data channel based at least in part on the energy per resource element ratio between the first resource element associated with the demodulation reference signal candidate and the second resource element associated with the data channel.

8. The method of claim 1, wherein receiving the message comprises:

receiving a radio resource control configuration message comprising the indication of the set of demodulation reference signal candidates for the data channel.

9. The method of claim 1, further comprising the third procedure.

10. The method of claim 9, wherein the size of the radio frequency spectrum subband is UE-specific.

11. The method of claim 1, further comprising the fourth procedure.

12. The method of claim 1, further comprising the fifth procedure.

13. The method of claim 1, wherein the data channel comprises a physical downlink shared channel.

14. The method of claim 1, wherein the data channel comprises a physical uplink shared channel.

15. A method for wireless communication at a user equipment (UE), comprising:

receiving a message comprising an indication of a set of demodulation reference signal candidates for a data channel;

determining a set of parameters associated with the set of demodulation reference signal candidates based at least in part on the received message, the set of parameters corresponding to a radio frequency spectrum subband or a radio frequency spectrum band associated with the data channel; and estimating one or more characteristics of the data channel using the set of parameters associated with the set of demodulation reference signal candidates, wherein the method further comprises a first procedure, a second procedure, a third procedure, or a fourth procedure, wherein the first procedure comprises:

receiving a channel state information report comprising an indication of a size of the radio frequency spectrum subband; and identifying the size of the radio frequency spectrum subband based at least in part on the received channel state information report, wherein estimating the one or more characteristics of the data channel comprises: estimating the one or more characteristics of the data channel based at least in part on the size of the radio frequency spectrum subband;

wherein the second procedure comprises:

determining at least two adjacent symbols associated with the set of demodulation reference signal candidates for the data channel comprise a same quasi co-location type based at least in part on the set of parameters associated with the set of demodulation reference signal candidates, wherein estimating the one or more characteristics of the data channel comprises: estimating the one or more characteristics of the data channel based at least in part on the at least two adjacent symbols associated with the set of demodulation reference signal candidates for the data channel comprising a same quasi co-location type;

wherein the third procedure comprises:

determining at least two adjacent symbols associated with the set of demodulation reference signal candidates for the data channel comprise different quasi co-location types based at least in part on the set of parameters associated with the set of demodulation reference signal candidates, wherein estimating the one or more characteristics of the data channel comprises: estimating the one or more characteristics of the data channel based at least in part on the at least two adjacent symbols associated with the set of demodulation reference signal candidates for the data channel comprising different quasi co-location types; and wherein the fourth procedure comprises:

determining a default demodulation reference signal candidate of the set of demodulation reference signal candidates for the data channel based at least in part on the received message, wherein estimating the one or more characteristics of the data channel comprises: estimating the one or more characteristics of the data channel using the default demodulation reference signal candidate.

16. The method of claim 15, further comprising the second procedure.

17. The method of claim 15, further comprising the third procedure.

18. The method of claim 15, further comprising the fourth procedure.

19. The method of claim 15, further comprising the first procedure.

20. A method for wireless communication at a user equipment (UE), comprising:

receiving a message comprising an indication of a set of demodulation reference signal candidates for a data channel;

determining a set of parameters associated with the set of demodulation reference signal candidates based at least in part on the received message, the set of parameters corresponding to a radio frequency spectrum subband or a radio frequency spectrum band associated with the data channel; and estimating one or more characteristics of the data channel using the set of parameters associated with the set of demodulation reference signal candidates, wherein receiving the message comprises:

receiving a downlink control information message; and identifying at least one demodulation reference signal candidate of the set of demodulation reference signal candidates for the data channel based at least in part on the downlink control information message, wherein estimating the one or more characteristics of the data channel comprises:

estimating the one or more characteristics of the data channel using the at least one demodulation reference signal candidate.

21. The method of claim 20, wherein the downlink control information message comprises a group common downlink control information message associated with a group of UEs.

22. The method of claim 21, wherein the group common downlink control information message comprises a second indication of the at least one demodulation reference signal candidate of the set of demodulation reference signal candidates for the data channel.

23. A method for wireless communication at a user equipment (UE), comprising:

receiving a message comprising an indication of a set of demodulation reference signal candidates for a data channel;

determining a set of parameters associated with the set of demodulation reference signal candidates based at least in part on the received message, the set of parameters corresponding to a radio frequency spectrum subband or a radio frequency spectrum band associated with the data channel; and estimating one or more characteristics of the data channel using the set of parameters associated with the set of demodulation reference signal candidates, wherein the method further comprises a first procedure, a second procedure, a third procedure, or a fourth procedure, wherein the first procedure comprises:

determining an order of each demodulation reference signal candidate in the set of demodulation reference signal candidates for the data channel based at least in part on the received message, wherein estimating the one or more characteristics of the data channel comprises: estimating the one or more characteristics of the data channel based at least in part on the order of each demodulation reference signal candidate in the set of demodulation reference signal candidates;

wherein the second procedure comprises:

receiving a downlink control information message comprising a second indication of a differential step identifying a differential demodulation reference signal candidate index-step; and selecting a demodulation reference signal candidate from the set of demodulation reference signal candidates by comparing the differential demodulation reference signal candidate index-step to an index of a default demodulation reference signal candidate, wherein estimating the one or more characteristics of the data channel comprises: estimating the one or more characteristics of the data channel using the selected demodulation reference signal candidate;

wherein the third procedure comprises:

identifying a demodulation reference signal candidate having a highest demodulation reference signal density in the set of demodulation reference signal candidates; and determining a default transport block size associated with the data channel based at least in part on the identified demodulation reference signal candidate having the highest demodulation reference signal density, wherein estimating the one or more characteristics of the data channel comprises: estimating the one or more characteristics of the data channel based at least in part on the default transport block size associated with the data channel; and wherein the fourth procedure comprises:

identifying a demodulation reference signal candidate having a lowest demodulation reference signal density in the set of demodulation reference signal candidates; and determining a default transport block size associated with the data channel based at least in part on the identified demodulation reference signal candidate having the lowest demodulation reference signal density, wherein estimating the one or more characteristics of the data channel comprises: estimating the one or more characteristics of the data channel based at least in part on the default transport block size associated with the data channel.

24. The method of claim 23, further comprising the second procedure.

25. The method of claim 24, wherein the downlink control information message comprises a group common downlink control information message associated with a group of UEs.

26. The method of claim 23, further comprising the third procedure.

27. The method of claim 23, further comprising the fourth procedure.

28. The method of claim 23, further comprising the first procedure.

29. The method of claim 28, further comprising:

determining a density of the set of demodulation reference signal candidates or an energy per resource element ratio of each demodulation reference signal candidate of the set of demodulation reference signal candidates; and ordering each demodulation reference signal candidate in the set of demodulation reference signal candidates based at least in part on the density of the set of demodulation reference signal candidates or the energy per resource element ratio of each demodulation reference signal candidate of the set of demodulation reference signal candidates, wherein estimating the one or more characteristics of the data channel comprises:

estimating the one or more characteristics of the data channel based at least in part on the ordering.

30. A method for wireless communication at a user equipment (UE), comprising:

receiving a message comprising an indication of a set of demodulation reference signal candidates for a data channel;

determining a set of parameters associated with the set of demodulation reference signal candidates based at least in part on the received message, the set of parameters corresponding to a radio frequency spectrum subband or a radio frequency spectrum band associated with the data channel; and estimating one or more characteristics of the data channel using the set of parameters associated with the set of demodulation reference signal candidates, wherein estimating the one or more characteristics of the data channel further comprises:

estimating the one or more characteristics of the data channel based at least in part on blind selecting a demodulation reference signal candidate of the set of demodulation reference signal candidates.

31. A method for wireless communication at a user equipment (UE), comprising:

receiving a message comprising an indication of a set of demodulation reference signal candidates for a data channel;

determining a set of parameters associated with the set of demodulation reference signal candidates based at least in part on the received message, the set of parameters corresponding to a radio frequency spectrum subband or a radio frequency spectrum band associated with the data channel;

estimating one or more characteristics of the data channel using the set of parameters associated with the set of demodulation reference signal candidates;

receiving a second message comprising a second indication to activate one or more demodulation reference signal candidates of the set of demodulation reference signal candidates for the data channel; and receiving a third message comprising a third indication of at least one demodulation reference signal candidate of the activated one or more demodulation reference signals, wherein estimating the one or more characteristics of the data channel comprises:

estimating the one or more characteristics of the data channel using the at least one demodulation reference signal candidate.

32. The method of claim 31, wherein the third message comprises a UE-specific downlink control information message or a group common downlink control information message, and the second message comprises a medium access control-control element message.

33. A method for wireless communication at a user equipment (UE), comprising:

receiving a message comprising an indication of a set of demodulation reference signal candidates for a data channel;

determining a set of parameters associated with the set of demodulation reference signal candidates based at least in part on the received message, the set of parameters corresponding to a radio frequency spectrum subband or a radio frequency spectrum band associated with the data channel;

estimating one or more characteristics of the data channel using the set of parameters associated with the set of demodulation reference signal candidates;

receiving a second message comprising a second indication to deactivate the one or more demodulation reference signal candidates of the set of demodulation reference signal candidates; and receiving a third message comprising a third indication of at least one demodulation reference signal candidate of the set of demodulation reference signal candidates remaining activated, wherein estimating the one or more characteristics of the data channel comprises:

estimating the one or more characteristics of the data channel using the at least one demodulation reference signal candidate.

34. The method of claim 33, wherein the third message comprises a UE-specific downlink control information message or a group common downlink control information message, and the second message comprises a medium access control-control element message.

35. A method for wireless communication at a user equipment (UE), comprising:

receiving a message comprising an indication of a set of demodulation reference signal candidates for a data channel;

determining a set of parameters associated with the set of demodulation reference signal candidates based at least in part on the received message, the set of parameters corresponding to a radio frequency spectrum subband or a radio frequency spectrum band associated with the data channel;

estimating one or more characteristics of the data channel using the set of parameters associated with the set of demodulation reference signal candidates;

identifying a quasi co-location state or a transmission configuration indication state based at least in part on the received message; and determining a demodulation reference signal candidate of the set of demodulation reference signal candidates based at least in part on the quasi co-location state or the transmission configuration indication state, wherein estimating the one or more characteristics of the data channel comprises:

estimating the one or more characteristics of the data channel using the determined demodulation reference signal candidate.

* * * * *